United States Patent
Moriyoshi

(10) Patent No.: US 10,448,035 B2
(45) Date of Patent: Oct. 15, 2019

(54) INFORMATION COMPRESSION DEVICE, INFORMATION COMPRESSION METHOD, NON-VOLATILE RECORDING MEDIUM, AND VIDEO CODING DEVICE

(71) Applicant: NEC CORPORATION, Tokyo (JP)

(72) Inventor: Tatsuji Moriyoshi, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/773,216

(22) PCT Filed: Nov. 9, 2016

(86) PCT No.: PCT/JP2016/083262
§ 371 (c)(1),
(2) Date: May 3, 2018

(87) PCT Pub. No.: WO2017/082304
PCT Pub. Date: May 18, 2017

(65) Prior Publication Data
US 2018/0324446 A1    Nov. 8, 2018

(30) Foreign Application Priority Data

Nov. 11, 2015   (JP) .................................. 2015-220990

(51) Int. Cl.
*H04N 19/423* (2014.01)
*H04N 19/176* (2014.01)
(Continued)

(52) U.S. Cl.
CPC ......... *H04N 19/423* (2014.11); *H04N 19/124* (2014.11); *H04N 19/176* (2014.11);
(Continued)

(58) Field of Classification Search
CPC ........ G16B 30/00; G16B 50/00; G16B 40/00; G16B 20/00; G06T 7/73; G06T 11/60; G06T 7/174; G06T 7/74; G06T 11/00
See application file for complete search history.

(56) References Cited

U.S. PATENT DOCUMENTS

| | | | |
|---|---|---|---|
| 6,996,280 B1 * | 2/2006 | Matsukawa | G06T 9/004 382/236 |
| 2010/0232685 A1 * | 9/2010 | Yokokawa | H04N 5/142 382/159 |

(Continued)

FOREIGN PATENT DOCUMENTS

| | | |
|---|---|---|
| JP | 2-226886 A | 9/1990 |
| JP | 10-336677 A | 12/1998 |

(Continued)

OTHER PUBLICATIONS

"Advanced video coding for generic audiovisual services", ITU-T Recommendation H.264, online, Mar. 2010, searched at Oct. 20, 2015,812 pages, Internet, <URL:http://www.itu.int/rec/T-REC-H.264>.

(Continued)

*Primary Examiner* — Dave Czekaj
*Assistant Examiner* — Kehinde Abimbola
(74) *Attorney, Agent, or Firm* — Sughrue Mion, PLLC

(57) ABSTRACT

Provided is an information compression device or the like which is capable of compressing information required for encoding processing to a smaller size. The information compression device calculates a number of non-zero blocks having a value equal or greater than a predetermined value, determine a position for storing the non-zero blocks in a memory, and store only the non-zero blocks to a memory area in accordance with the determined position.

10 Claims, 17 Drawing Sheets

(51) Int. Cl.
*H04N 19/60* (2014.01)
*H04N 19/426* (2014.01)
*H04N 19/436* (2014.01)
*H04N 19/124* (2014.01)
*H04N 19/184* (2014.01)

(52) U.S. Cl.
CPC ......... *H04N 19/184* (2014.11); *H04N 19/426* (2014.11); *H04N 19/436* (2014.11); *H04N 19/60* (2014.11)

(56) References Cited

U.S. PATENT DOCUMENTS

| | | | | |
|---|---|---|---|---|
| 2012/0207400 | A1* | 8/2012 | Sasai | H03M 7/4018 |
| | | | | 382/233 |
| 2012/0306689 | A1* | 12/2012 | Yule | G01S 5/0036 |
| | | | | 342/357.25 |

FOREIGN PATENT DOCUMENTS

| | | |
|---|---|---|
| JP | 2006-295796 A | 10/2006 |
| WO | 2013/088687 A1 | 6/2013 |
| WO | 2014/167609 A1 | 10/2014 |

OTHER PUBLICATIONS

"Advanced video coding for generic audiovisual services" ITU-T Recommendation H.265, online, Apr. 2013,634 pages searched at Oct. 20, 2015 , Internet, <URL:http://www.itu.int/rec/T-REC-H.265>.

Keng-Pang Lim et al. "Text Description of Joint Mode Reference Encoding Method and Decoding Concealment Method" Joint Video Team(JVT) of ISO/IEC MPEG and ITU-T VCEG, Document JVT-0079, online, Apr. 2005, searched at Oct. 20, 2015, 44 pages Internet, <URL:http://www.researchgate.net/publication/248617543.

K. McAnn et al., "High Efficiency Video Coding(HEVC) Test Model 16(HM 16) Improved Encoder Description" Joint Collaborative Team on Video Coding (JCT-VC) of ITU-T SG16 WP3 and ISO/IEC JTC1/SC29/WG11, Document JCTVC-51002 online, Oct. 2014, searched at Oct. 20, 2015, 54 pages, Internet, <URL:http://mpeg.chiariglione.org/standards/mpeg-h/high-efficiency-video-coding/n14970-high-efficiency-video-coding-hevc-test-model-16.

Gary Sullivan, "DirectX Video Acceleration Specification for H.264/AVC Decoding" Microsoft, Corporation, online Dec. 2010, searched at Oct. 20, 2015, 72 pages, Internet, <URL:http://www.microsoft.com/en-us/download/details.aspx?id=11323.

International Search Report of PCT/JP2016/083262 filed Feb. 14, 2017.

* cited by examiner

Fig.8

| BLOCK NUMBER | NUMBER OF BLOCKS | FIRST POSITION INFORMATION |
|---|---|---|
| 1 | 3 | 1 |
| 2 | 5 | 4 |
| 3 | 6 | 9 |
| ... | ... | ... |

Fig.9

| TYPE INFORMATION | POSITION | | SIZE | NON-ZERO POSITION | | NON-ZERO? | SECOND POSITION INFORMATION |
| --- | --- | --- | --- | --- | --- | --- | --- |
| | VERTICAL DIRECTION | LATERAL DIRECTION | | VERTICAL DIRECTION | LATERAL DIRECTION | | |
| 1 | 1 | 1 | 16 | 3 | 5 | 1,1,0,... | 1 |
| 1 | 16 | 8 | 8 | 4 | 7 | 1,0,1,... | 3 |
| 2 | 1 | 1 | 8 | 5 | 5 | 0,1,1,... | 5 |
| ... | ... | ... | ... | ... | ... | ... | ... |

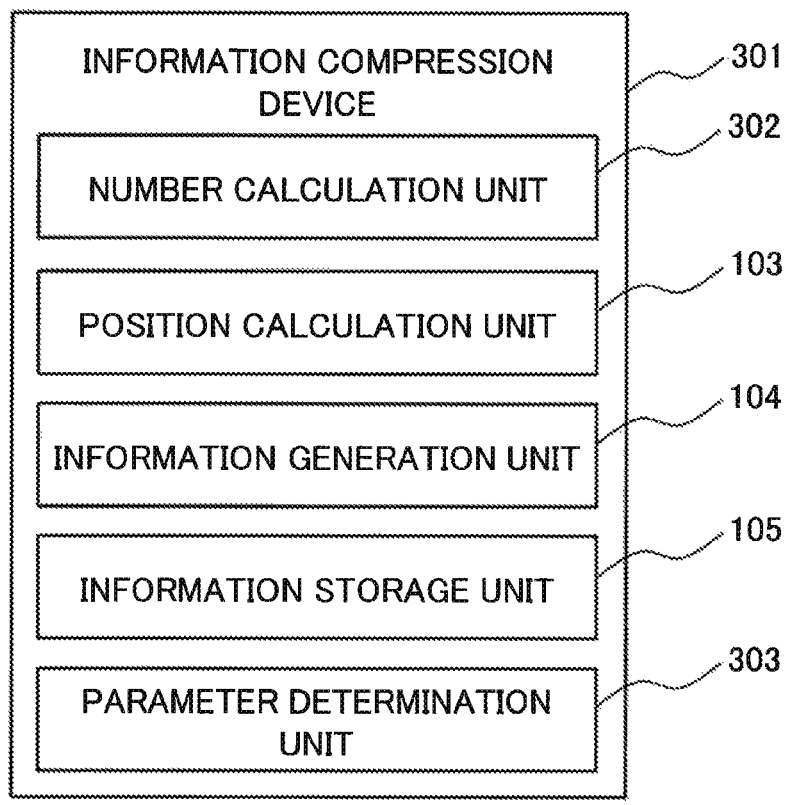

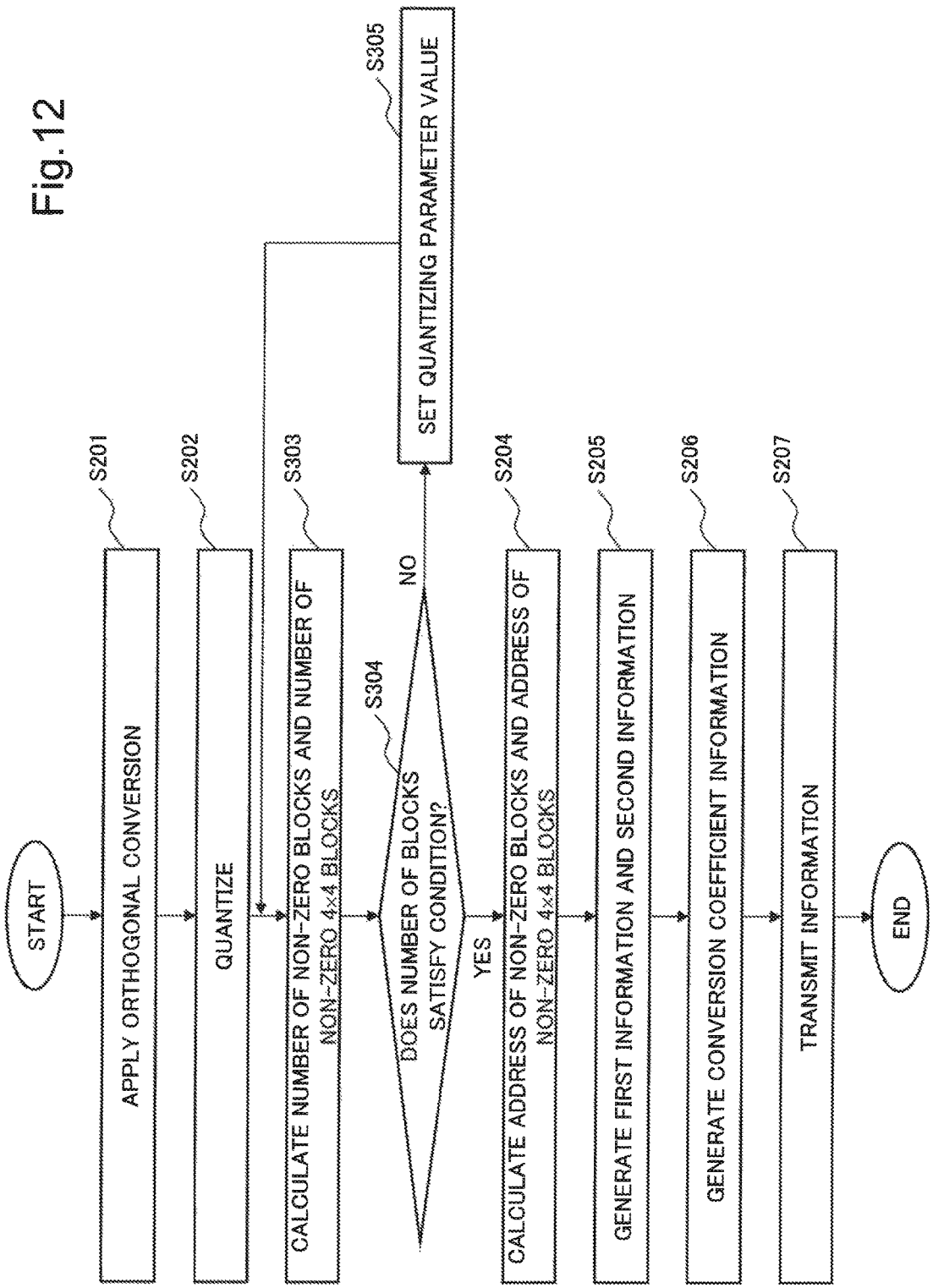

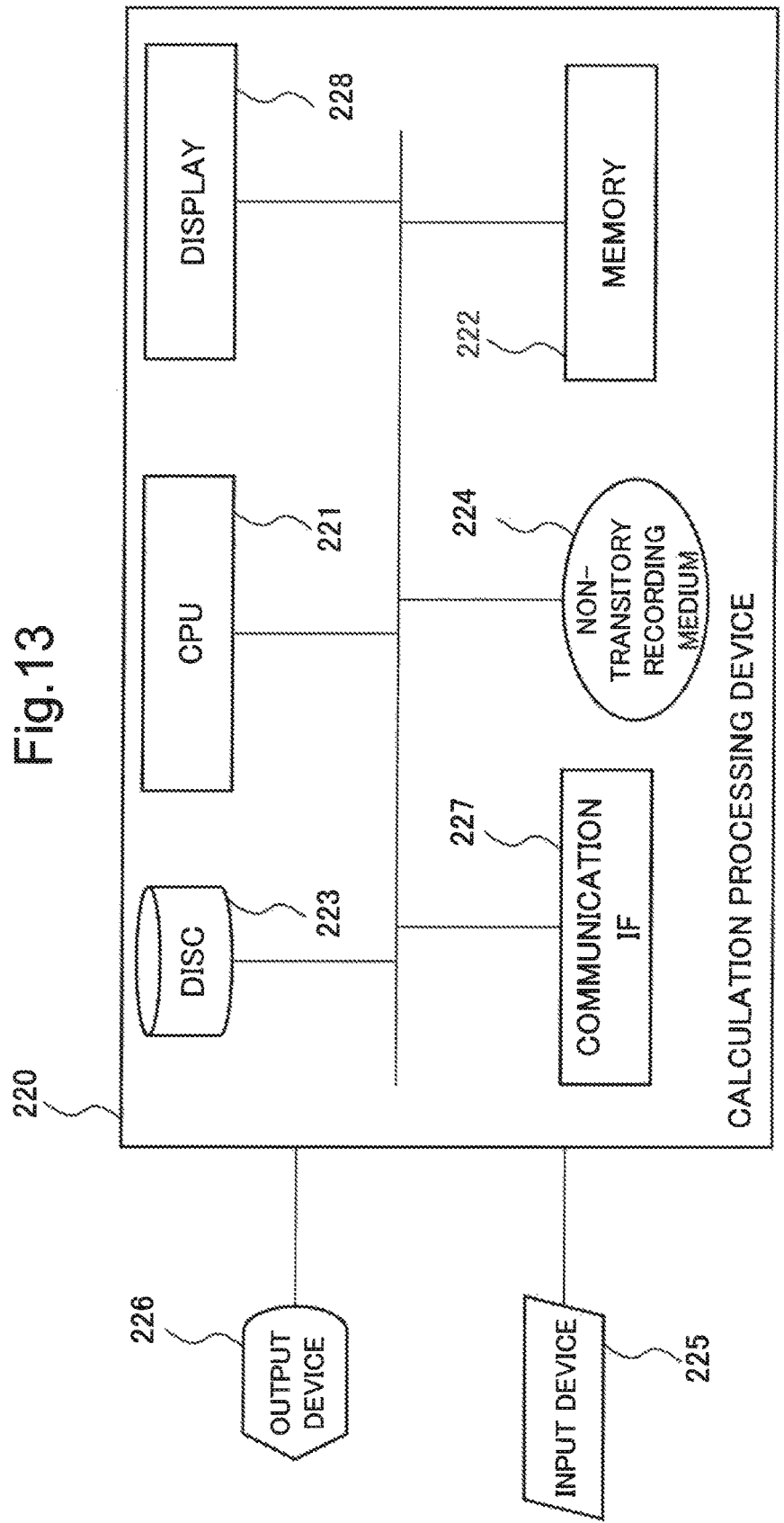

INFORMATION COMPRESSION DEVICE, INFORMATION COMPRESSION METHOD, NON-VOLATILE RECORDING MEDIUM, AND VIDEO CODING DEVICE

The application is a National Stage of International Application No. PCT/JP2016/083262 filed Nov. 9, 2016, claiming priority based on Japanese Patent Application No. 2015-220990 filed Nov. 11, 2015, the disclosure of which is incorporated herein in its entirety.

TECHNICAL FIELD

The present invention relates to, for example, an information compression device and the like that compress a size of information.

BACKGROUND ART

A compression coding technique for video data has widely prevailed and is used for applications such as digital broadcasting, distribution of a video content with an optical disk, and video delivery via a communication network such as the Internet. An H.261 method and an H.263 method standardized by ITU are examples of coding techniques for generating coded data by coding video data with high image quality at a low bit rate and a high compression rate and for decoding coded video data. Further, the coding techniques includes MPEG-1, MPEG-2, and MPEG-4 created by ISO and VC-1 standardized by SMPTE and the coding techniques have been widely used as an international standard.

ITU is an abbreviation of International Telecommunication Union. ISO represents an abbreviation of International Organization for Standardization. MPEG is an abbreviation of Moving Picture Experts Group. SMPTE is an abbreviation of Society of Motion Picture and Television Engineers.

Further, H.264/MPEG-4 AVC (hereinafter, referred to as an "H.264 method") cooperatively standardized by ITU and ISO is prevailing. NPL 1 discloses an H.264 method. Further, H.265/MPEG-H HEVC (hereinafter, referred to as an "H.265 method") is standardized in 2013 as a standard relating to compression coding for video data. NPL 2 discloses an H.265 method. An H.265 method is said to be a technique capable of compressing, for each image in video data, a size of the video data approximately by half while ensuring image quality comparable to an H.264 method, and is expected to be used in a wide range of fields in the future.

AVC is an abbreviation of Advanced Video coding. HEVC is an abbreviation of High Efficiency Video coding.

These video coding techniques include, for example, an element technique such as motion compensation prediction processing, orthogonal conversion processing for a predictive error image, quantizing processing for an orthogonal conversion coefficient, and entropy coding processing for an orthogonal conversion coefficient applied with quantizing processing, and therefore are referred to as a hybrid coding technique. These video coding techniques execute an intra-frame prediction processing and an inter-frame prediction based on relevance between pieces of image data relating to a spatial direction and a temporal axis direction, the relevance being one characteristic of image data, and thereby achieve high compression efficiency for video data. The inter-frame prediction includes motion compensation prediction processing of generating a predicted image by correcting a motion of an object such as a subject and a background between pieces of image data temporally close to each other and a position deviation relating to the object.

As an example of the video coding technique, PTL 1 and NPL 5 disclose, for example, coding devices that efficiently execute the video coding processing. These devices reduce a size of a conversion coefficient value series including a quantized orthogonal conversion coefficient, and thereby efficiently execute video coding processing.

CITATION LIST

Patent Literature

PTL 1: International Publication No. WO 2014/167609

Non-Patent Literature

NPL 1: ITU-T Recommendation H.264 "Advanced video coding for generic audiovisual services", [online], March 2010, [Searched at Oct. 20, 2015], Internet <URL:http://www.itu.int/rec/T-REC-H.264>

NPL 2: ITU-T Recommendation H.265 "Advanced video coding for generic audiovisual services", [online], April 2013, [Searched at Oct. 20, 2015], Internet <URL:http://www.itu.int/rec/T-REC-H.265>

NPL 3: Joint Video Team (JVT) of ISO/IEC MPEG and ITU-T VCEG, Document JVT-0079, "Text Description of Joint Mode Reference Encoding Method and Decoding Concealment Method", [online], April 2005, [Searched at Oct. 20, 2015], Internet <URL:http://www.researchgate.net/publication/248617543 Text Description of Joint Model Reference Encoding Methods and Decoding Concealment Methods>

NPL 4: Joint Collaborative Team on Video Coding (JCT-VC) of ITU-T SG16 WP3 and ISO/IEC JTC1/SC29/WG11, Document JCTVC-S 1002, "High Efficiency Video Coding (HEVC) Test Model 16 (HM 16) Improved Encoder Description", [online], October 2014, [Searched at Oct. 20, 2015], Internet <URL:http://mpeg.chiariglione.org/standards/mpeg-h/high-efficiency-vide o-coding/n14970-high-efficiency-video-coding-hevc-test-model-16>

NPL 5: Microsoft Corporation, "DirectX Video Acceleration Specification for H.264/AVC Decoding", [online], December 2010, [Searched at Oct. 20, 2015], Internet <URL:http://www.microsoft.com/en-us/download/details.aspx?id=11323>

SUMMARY OF INVENTION

Technical Problem

The video coding technique disclosed in PTL 1 has, for example, a difficulty of reducing a size of a quantized conversion coefficient value series sufficiently. This difficulty will be described in detail. PTL 1 discloses data conversion processing of converting 1024-bit conversion coefficient information to 512-bit fixed length data. The data conversion processing is fixed length calculation processing of a conversion coefficient value series calculated as a conversion result. Therefore, the data conversion processing itself is simple and further, can archives high parallelism efficiency. However, the data conversion processing has a problem that a size of a conversion coefficient value series can be reduced to only half a size of a conversion coefficient value series before conversion. Further, the data conversion processing keeps flags indicating whether or not to be a non-zero value for all values of conversion coefficients (i.e. an orthogonal conversion block or a conversion coefficient value series) obtained by orthogonal transformation of a certain pixels block. Therefore, the video coding processing has a problem that a storage area required for keeping these flags increases in case of, for example, a pixels block (e.g. 16×16 pixels, 32×32 pixels, or the like) appended in an H.265 method, Therefore, one main object of the present invention is to provide an information compression device and the like capable of compressing information necessary for coding processing to a smaller size.

Solution to Problem

In order to achieve the above-described object, as an aspect of the present invention, an information compression device including:

In addition, as another aspect of the present invention, an information compression method including:

number calculation means for calculating, based on a numerical value series representing a target image in a plurality of first blocks obtained by dividing the target image for a first size, with respect to a second block having a second size equal to or greater than the first size, a first number of a first block where a numerical value included in the numerical value series relating to the first block included in the second block is equal to or greater than a predetermined value, and calculating, with respect to a third block having a third size equal to or smaller than the first size, a second number where a numerical value included in the numerical value series relating to the third block is equal to or greater than the predetermined value;

position calculation means for calculating, based on the calculated second number, second position information upon storing the numerical value series relating to the third block on a memory, and calculating, based on the calculated first number and the calculated second number, first position information upon storing, on the memory, second information relating to the first block included in the second block, the second information including at least the second position information relating to the third block included in the first block;

information generation means for generating first information including at least the first position information and the second information, and storing the generated second information in a storage area indicated by the first position information in the memory; and information storage means for storing, in a storage area indicated by the second position information in the memory, the numerical value series relating to the third block where a numerical value included in the numerical value series relating to the third block is equal to or greater than the predetermined value.

In addition, as another aspect of the present invention, an information compression program, that realize a computer, including:

calculating, based on a numerical value series representing a target image in a plurality of first blocks obtained by dividing the target image for a first size, with respect to a second block having a second size equal to or greater than the first size, a first number of a first block where a numerical value included in the numerical value series relating to the first block included in the second block is equal to or greater than a predetermined value, and calculating, with respect to a third block having a third size equal to or smaller than the first size, a second number where a numerical value included in the numerical value series relating to the third block is equal to or greater than the predetermined value;

calculating, based on the calculated second number, second position information upon storing the numerical value series relating to the third block on a memory, and calculating, based on the calculated first number and the calculated second number, first position information upon storing, on the memory, second information relating to the first block included in the second block, the second information including at least the second position information relating to the third block included in the first block;

generating first information including at least the first position information and the second information, and storing the generated second information in a storage area indicated by the first position information in the memory; and storing, in a storage area indicated by the second position information in the memory, the numerical value series relating to the third block where a numerical value included in the numerical value series relating to the third block is equal to or greater than the predetermined value.

Furthermore, the object is also realized by a computer-readable recording medium which records the information compression program.

Advantageous Effects of Invention

The information compression device and the like according to the present invention can compress information necessary for coding processing to a smaller size.

BRIEF DESCRIPTION OF DRAWINGS

FIG. 8 is a diagram conceptually illustrating one example of a data structure in first information.

FIG. 9 is a diagram conceptually illustrating one example of a data structure of second information.

FIG. 10 is a diagram conceptually illustrating one example of a data structure included in conversion coefficient information.

FIG. 11 is a block diagram illustrating a configuration of an information compression device according to a third example embodiment of the present invention.

FIG. 12 is a flowchart illustrating a flow of processing in a video coding device including the information compression device according to the third example embodiment.

FIG. 13 is a block diagram schematically illustrating a hardware configuration of a calculation processing device capable of realizing an information compression device or a coding device according to each example embodiment of the present invention.

DESCRIPTION OF EMBODIMENTS

In order to easily understand the present invention, a video coding device 501 relating to the present invention and processing in the video coding device 501 will be described with reference to FIG. 14 to FIG. 20.

Figure 14:
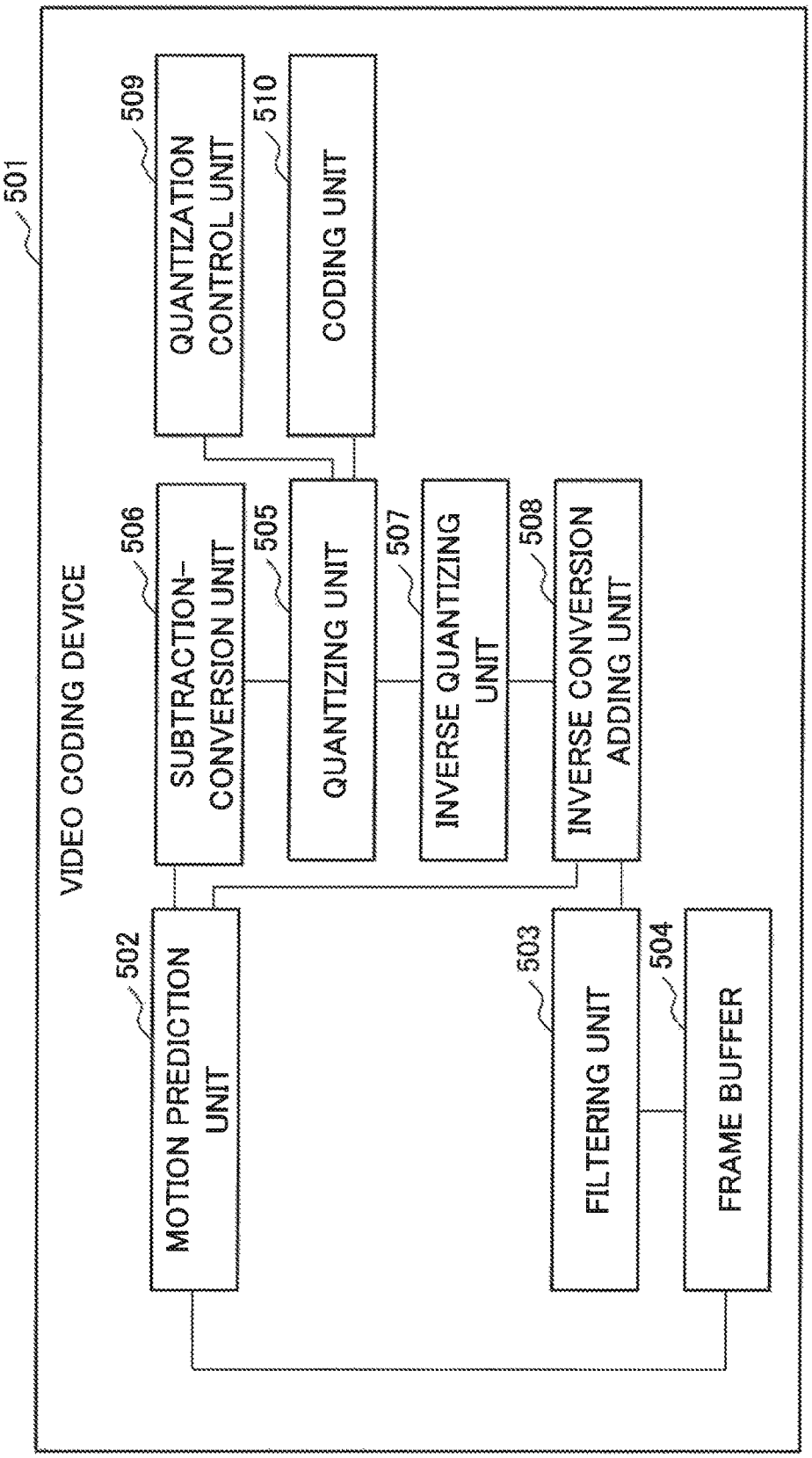
FIG. 14 is a block diagram illustrating a configuration of a video coding device.

First, with reference to FIG. 14, the video coding device 501 that executes the video coding processing will be described. FIG. 14 is a block diagram illustrating a configuration of the video coding device 501.

The video coding device 501 includes a motion prediction unit (motion predictor) 502, a filtering unit (filter) 503, a frame buffer 504, a quantizing unit (quantizer) 505, a subtraction-conversion unit (subtraction-converter) 506, an inverse quantizing unit (inverse quantizer) 507, an inverse conversion adding unit (inverse conversion adder) 508, a quantization control unit (quantization controller) 509, and an entropy coding unit (entropy coder) 510 (hereinafter, referred to as an "coding unit 510").

The frame buffer 504 can store image data generated as a result of coding processing for a certain frame (frame image). For convenience of description, it is assumed that video data including image data (hereinafter, referred to as a "coded frame") generated as a result of coding processing for a certain frame are being stored in the frame buffer 504.

When receiving video data including a plurality of frames, the video coding device 501 executes coding processing of coding the video data per a pixels block unit obtained by dividing the received video data based on a predetermined size. The predetermined size is defined, as described below, in accordance with, for example, an H.264 method or an H.265 method.

In the case of an H.264 method, the predetermined size is a pixels block having a size including, for example, 16×16 pixels. The pixels block is referred to also as a macroblock (MBL) and is a rectangular pixels block including 16 pixels in a vertical direction and 16 pixels in a lateral direction. In the case of an H.265 method, the predetermined size is a pixels block having a size including 16×16 pixels, 32×32 pixels, or 64×64 pixels and the like, the pixels block being referred to as a coding tree unit (CTU).

Figure 15:
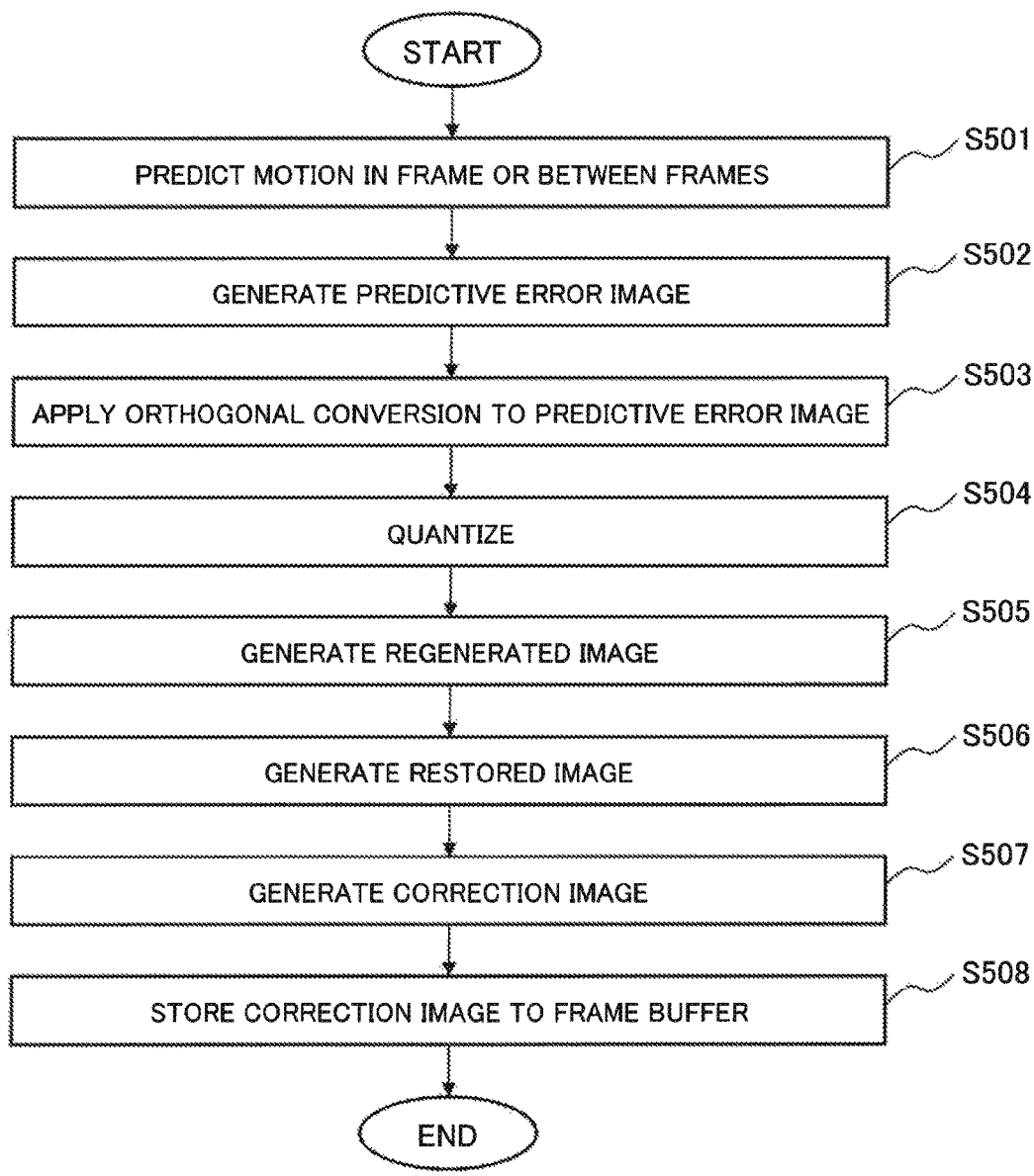
FIG. 15 is a flowchart illustrating a flow of processing in the video coding device.

Next, with reference to FIG. 15, processing in the video coding device 501 will be described. FIG. 15 is a flowchart illustrating a flow of processing in the video coding device 501.

The motion prediction unit 502 executes prediction processing in a frame or prediction processing between frames with respect to an object included in the received video data on the basis of received video data and a coded frame stored in the frame buffer 504 (step S501). The motion prediction unit 502 outputs a predicted image calculated as a result of the prediction processing to the subtraction-conversion unit 506. Hereinafter, prediction processing between frames will be referred to as "inter-frame prediction processing". Prediction processing in a frame will be referred to as "intra-frame prediction processing" in the following description.

The subtraction-conversion unit 506 inputs the predicted image output by the motion prediction unit 502. The subtraction-conversion unit 506 generates a predictive error image by subtracting the input predicted image from a frame to be predicted in the received video data (step S502). The subtraction-conversion unit 506 executes orthogonal conversion processing such as DCT (Discrete Cosine Transform) for the generated predictive error image (step S503). Through this processing, the subtraction-conversion unit 506 represents an image equivalent to the generated predictive error image by using a function including a plurality of frequency components. The subtraction-conversion unit 506 calculates a conversion coefficient value series including a conversion coefficient for a function including the frequency component with respect to each frequency component. The subtraction-conversion unit 506 outputs the generated conversion coefficient value series to the quantizing unit 505.

Note that, DCT represents an abbreviation of Discrete Cosine Transform.

In the case of an H.264 method, as the orthogonal conversion processing, processing is executed in a pixels block unit including 4×4 pixels or a pixels block unit including 8×8 pixels. In the case of an H.265 method, as the orthogonal conversion processing, orthogonal conversion processing is executed for each pixels block including 4×4 pixels to each pixels block including 32×32 pixels.

The quantizing unit 505 inputs the conversion coefficient value series output by the subtraction-conversion unit 506 and a quantizing parameter (QP) calculated by the quantization control unit 509. The quantizing unit 505 executes, on the basis of each conversion coefficient included in the input conversion coefficient value series and the input quantizing parameter, quantizing processing such that 0 is set as a value of a conversion coefficient when, for example, the value of the conversion coefficient is smaller than a value of a quantizing parameter (step S504). The quantizing unit 505 generates a conversion coefficient value series including conversion coefficients calculated by the quantizing processing and outputs the generated conversion coefficient value series to the inverse quantizing unit 507. For convenience of description, conversion coefficients calculated by the quantizing unit 505 are represented as a "quantized conversion coefficients" and a conversion coefficient value series calculated by the quantizing unit 505 is represented as a "quantized conversion coefficient value series".

The inverse quantizing unit 507 inputs the quantized conversion coefficient value series and executes inverse quantizing processing of generating an image (hereinafter, referred to as a "regenerated image") equivalent (or equal) to an input predictive error image on the basis of the quantized conversion coefficient value series (step S505). The inverse quantizing unit 507 outputs the regenerated image generated as a result of the inverse quantizing processing to the inverse conversion adding unit 508.

The inverse conversion adding unit 508 inputs the regenerated image output by the inverse quantizing unit 507 and generates an image (hereinafter, referred to as a "restored image") obtained by adding the input regenerated image and the predicted image output by the motion prediction unit 502

(step S506). The inverse conversion adding unit 508 outputs the generated restored image to the filtering unit 503.

The filtering unit 503 inputs the restored image output by the inverse conversion adding unit 508, executes filtering processing such that distortion included in an input restored image is reduced, and thereby generates an image (hereinafter, referred to as a "correction image") after the filtering processing (step S507). A filter used in filtering processing is, for example, a deblock filter (in the case of an H.264 method or in the case of an H.265 method) or a Sample Adaptive Offset (in the case of an H.265 method) and the like. The filtering unit 503 stores the generated correction image in the frame buffer 504 (step S508). The correction image is referred to as a coded frame stored in the frame buffer 504 when a following frame received after the coding processing is coded.

Further, the coding unit 510 executes entropy coding processing in accordance with a predetermined rule for a quantized conversion coefficient value series and thereby outputs a bit stream representing a coding result of the quantized conversion coefficient value series. Entropy coding processing is, for example, context adaptive binary arithmetic coding (CABAC) (in the case of an H.264 method or in the case of an H.265 method) or context-based adaptive variable length coding (CAVLC) (in the case of an H.264 method). Entropy coding processing is disclosed in, for example, NPL 3 or NPL 4, and therefore description on the entropy coding processing will be omitted.

The video coding device 501 executes processing that needs a large amount of calculation such as motion prediction processing, conversion processing, quantizing processing, inverse quantizing processing, inverse conversion processing, filtering processing for each frame included in video data, as described with reference to FIG. 14. Therefore, the video coding device 501 realizes video coding processing by executing an enormous amount of calculation processing.

In order to execute an enormous amount of calculation in a short period, for example, an accelerator is used. The accelerator is, for example, a GPU, a DSP, or an FPGA. A GPU is a processor capable of processing three-dimensional graphics at high speed. The GPU includes a parallel processor in which several hundred to several thousand processor cores are integrated. When processing itself has highly efficient parallelism, the GPU can execute the processing at a high speed several times to several ten times as fast as a general-purpose processor. The accelerator is not limited to the above-described example.

A GPU is an abbreviation of a Graphics Processing Unit. A DPS is an abbreviation of a Digital Signal Processor. An FPGA is an abbreviation of a Field Programmable Gate Array.

Hereinafter, for convenience of description, it is assumed that the accelerator is a GPU.

Figure 16:
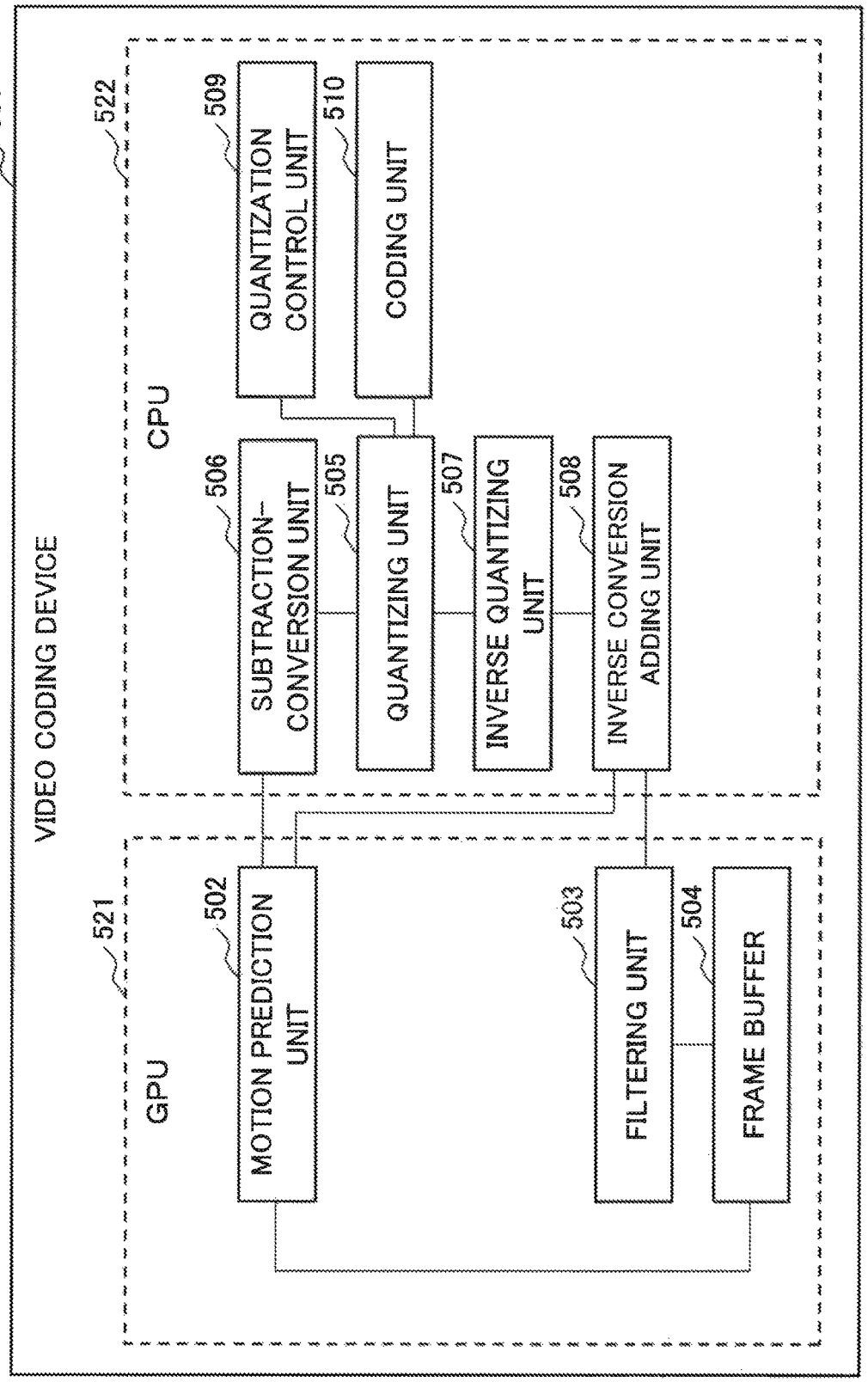
FIG. 16 is a diagram illustrating an example of a configuration of a video coding device including a GPU as an accelerator.

Intra-frame prediction processing executed by the motion prediction unit 502, inter-frame prediction processing executed by the motion prediction unit 502, or filtering processing executed by the filtering unit 503 specifically has a large amount of calculation among pieces of processing executed by each unit illustrated in FIG. 14. Therefore, in order to execute video coding processing in a short period, as exemplified in FIG. 16, intra-frame prediction processing, inter-frame prediction processing, and filtering processing may be allocated to a GPU 521. FIG. 16 is a diagram illustrating an example of a configuration of the video coding device 501 including the GPU 521 as an accelerator.

Processing in each unit illustrated in FIG. 16 is similar to the processing as described with reference to FIG. 14, and therefore description on the processing will be omitted. In the example illustrated in FIG. 16, the GPU 521 executes inter-frame prediction processing executed by the motion prediction unit 502, intra-frame prediction processing executed by the motion prediction unit 502, and filtering processing executed by the filtering unit 503. A CPU 522 executes processing executed by each unit illustrated as a subtraction-conversion unit 506, a quantizing unit 505, a quantization control unit 509, an inverse quantizing unit 507, an entropy coding unit 510, and an inverse conversion adding unit 508. Therefore, in the case of this example, processing including a large amount of calculation such as intra-frame prediction processing, inter-frame prediction processing, and filtering processing is allocated to the GPU 521, and therefore processing including an above-described large amount of calculation can be executed in a short period.

However, even when processing including a large amount of calculation is allocated to the GPU 521, the entire video coding processing is not always executed in a short period. The reason is that when the CPU 522 and the GPU 521 execute video coding processing, data transmission is needed between the CPU 522 and the GPU 521. The example illustrated in FIG. 16 executes three-times data transmissions, that is (1) input video data are transmitted from the CPU 522 to the GPU 521, (2) a predicted image is transmitted from the GPU 521 to the CPU 522, and (3) a restored image is transmitted from the CPU 522 to the GPU 521. Actually, a data transmission speed between different processors such as between the CPU 522 and the GPU 521 is frequently low. As a result, even when the GPU 521 executes processing itself including a large amount of calculation at high speed, a transmission time necessary for data transmission between the CPU 522 and the GPU 521 may be a bottleneck upon executing coding processing at high speed when a large amount of data are transmitted between the CPU 522 and the GPU 521.

Further, in processing executed by each unit exemplified in FIG. 14, conversion processing, quantizing processing, inverse quantizing processing, and inverse conversion processing include relatively a large amount of calculation. Further, adaptive QP selection processing or rate distortion (RD) optimization quantizing processing as disclosed in, for example, NPL 4 is more advanced and more complex quantizing processing, and an amount of calculation thereof is larger than in the quantizing processing described with reference to FIG. 14.

Figure 17:
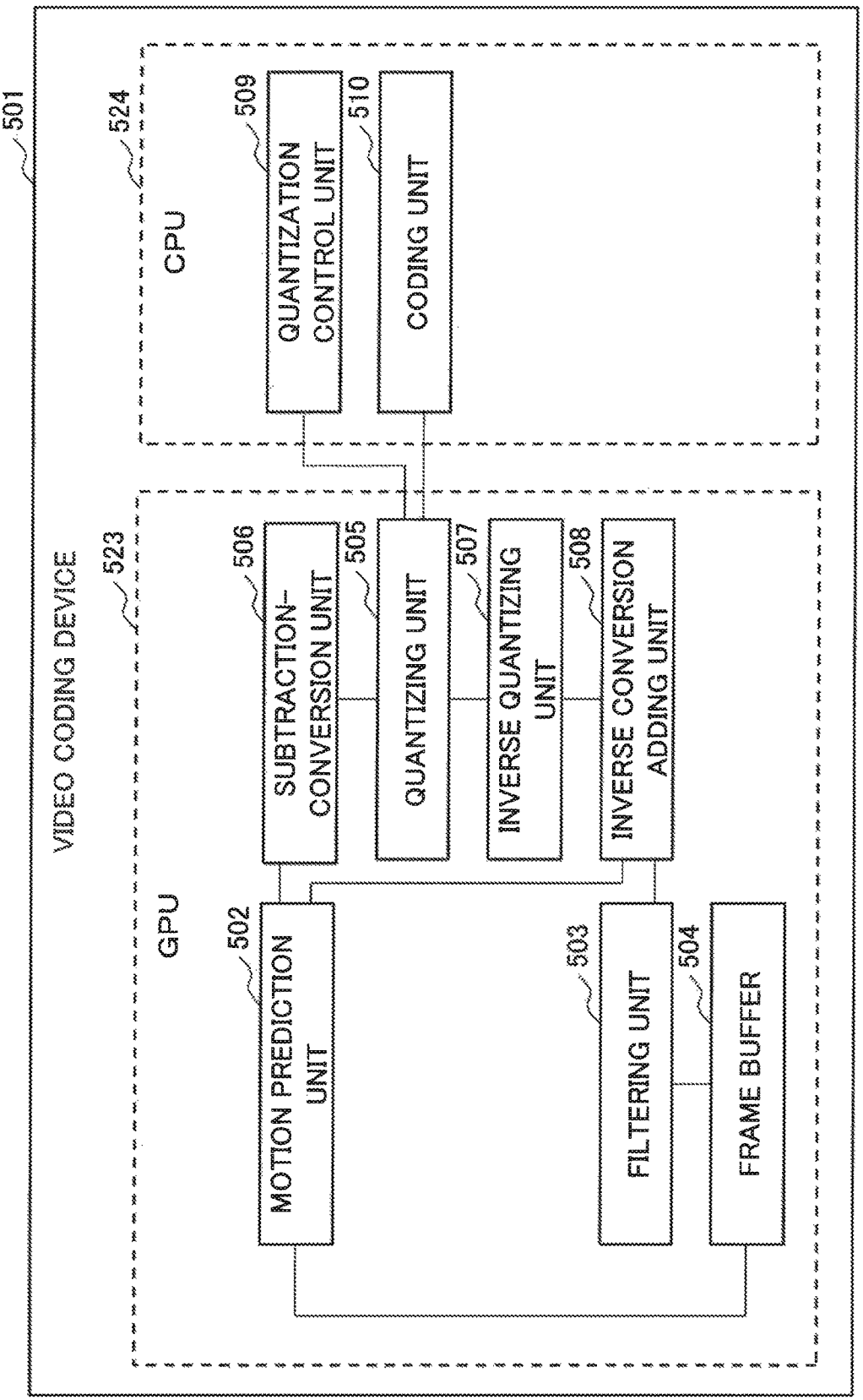
FIG. 17 is a diagram illustrating a configuration example included in a video coding device in which a GPU executes conversion processing, quantizing processing, inverse quantizing processing, and inverse conversion processing.

In order to execute the entire video coding processing in a short period, as in a video coding device 501 exemplified in FIG. 17, conversion processing, quantizing processing, inverse quantizing processing, and inverse conversion processing may be also allocated to a GPU 523. FIG. 17 is a diagram illustrating a configuration example included in the video coding device 501 in which the GPU 523 executes conversion processing, quantizing processing, inverse quantizing processing, and inverse conversion processing.

Processing in each unit illustrated in FIG. 17 is similar to processing in the video coding device 501 illustrated in FIG. 14, and therefore description on processing relating to each unit will be omitted. In the video coding device 501 exemplified in FIG. 17, differently from the video coding device 501 exemplified in FIG. 14, processing executed by a subtraction-conversion unit 506, a quantizing unit 505, an inverse quantizing unit 507, an inverse conversion adding unit 508, a filtering unit 503, and a motion prediction unit 502 is allocated to the GPU 523. In contrast, processing executed by a quantization control unit 509 and an entropy coding unit 510 is allocated to a CPU 524.

The GPU 523 executes conversion processing, quantizing processing, inverse quantizing processing, and inverse conversion processing, and thereby these pieces of processing themselves can be executed in a short period. However, similarly to the case described with reference to FIG. 16, even when processing including a large amount of calculation is allocated to the GPU 523, the entire video coding processing is not always executed in a short period. The reason is that the CPU 524 execute processing such as entropy coding processing and the CPU 524 and the GPU 523 transmit information such as a conversion coefficient value series output from the quantizing unit 505 to each other. Therefore, the processing of transmitting a conversion coefficient value series and the like may be a bottleneck when the entire video coding processing is executed in a short period. A matter about a bottleneck upon executing the entire video coding processing in a short period will be described with reference to an example.

When a size of a frame included in video data is approximately 8 bits to 10 bits, a size of a conversion coefficient value series calculated on the basis of the frame is approximately 16 bits. In other words, a size of a conversion coefficient value series is larger than the size of the frame. As a result, a time required for data transmission of a conversion coefficient and the like from the GPU 523 to the CPU 524 is longer than a time required for processing of transmitting the frame. Transmission processing between the GPU 523 and the CPU 524 may limit a processing speed of the entire video coding processing.

Figure 18:
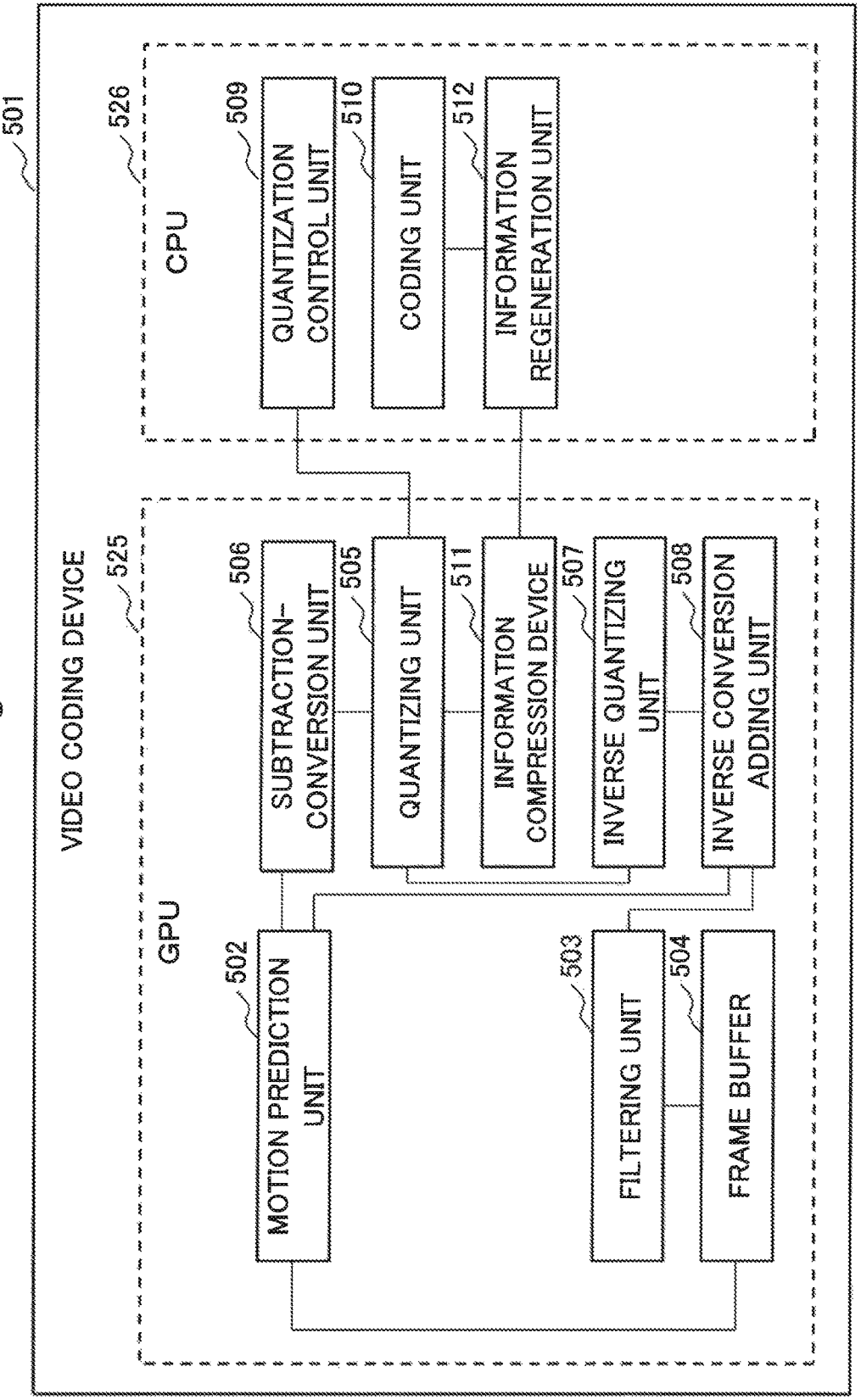
FIG. 18 is a diagram illustrating a configuration of a video coding device that executes video coding processing while reducing a size of a conversion coefficient value series.

Further, as another form, a video coding device 501 as exemplified in FIG. 18 is employable. FIG. 18 is a diagram illustrating a configuration of the video coding device 501 that executes video coding processing while reducing a size of a conversion coefficient value series.

Entropy coding processing is a sequential calculation processing. Therefore, the entropy coding processing can be executed in a shorter period upon allocation to the CPU 524 than upon allocation to the GPU 523 that executes processing at high speed by parallel processing.

The video coding device 501 further includes an information compression device 511 and an information regeneration unit 512, compared with the video coding device 501 exemplified in FIG. 17. A GPU 525 executes processing executed by a subtraction-conversion unit 506, a quantizing unit 505, an inverse quantizing unit 507, an inverse conversion adding unit 508, a filtering unit 503, a motion prediction unit 502, and the information compression device 511. A CPU 526 executes processing executed by the information regeneration unit 512, a quantization control unit 509, and a coding unit 510.

Figure 19:
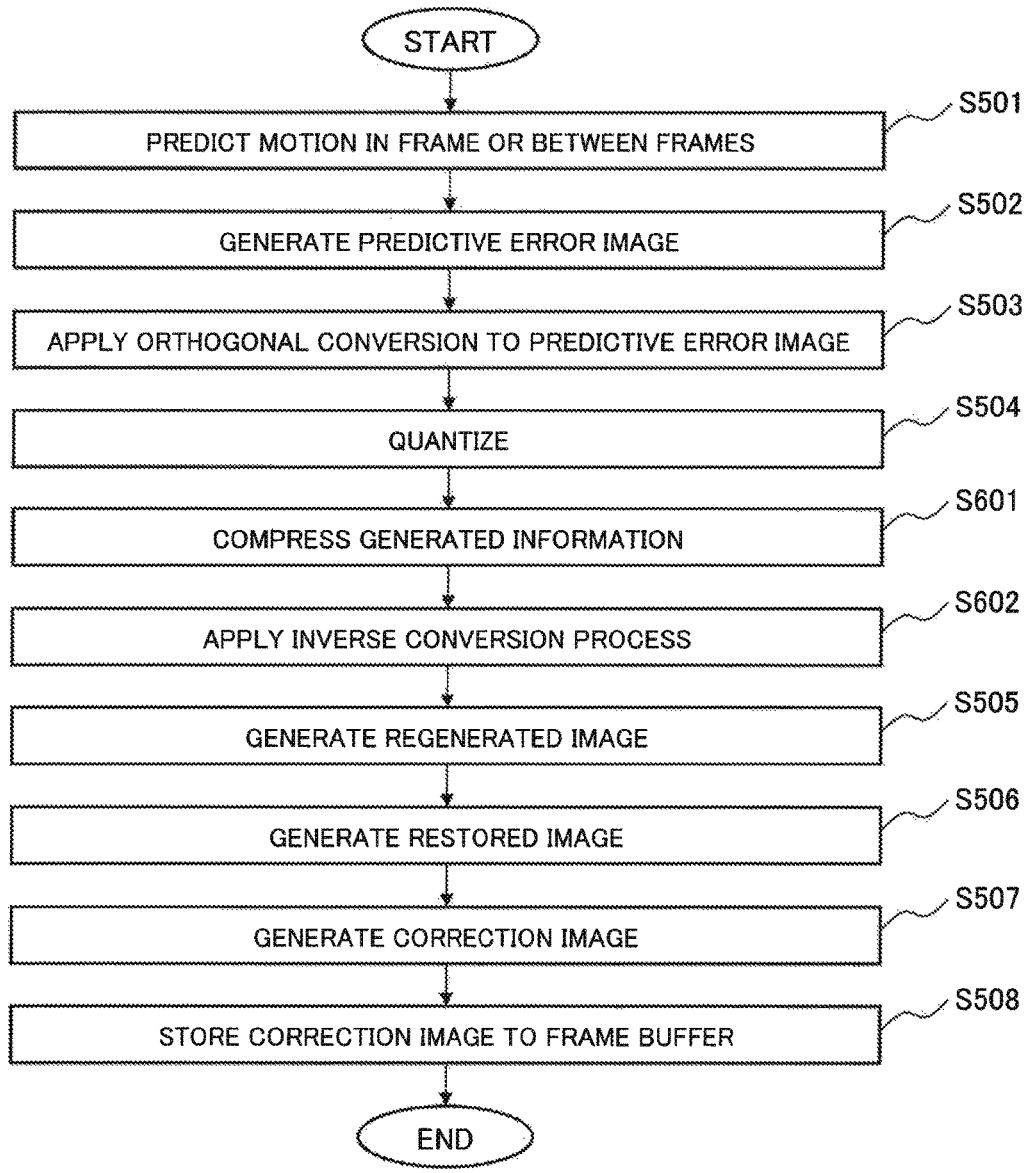
FIG. 19 is a flowchart illustrating a flow of processing in a video coding device.

With reference to FIG. 19, processing in the video coding device 501 illustrated in FIG. 18 will be described. FIG. 19 is a flowchart illustrating a flow of processing in the video coding device 501.

The information compression device 511 executes data conversion processing of reducing a size of a quantized conversion coefficient value series for the quantized conversion coefficient value series output by the quantizing unit 505 (step S601). The information compression device 511 in the GPU 525 transmits the converted data to the information regeneration unit 512 in the CPU 526. In other words, the converted data are transmitted from the GPU 525 to the CPU 526.

The information regeneration unit 512 receives the data transmitted by the information compression device 511, executes, for the received data, inverse conversion processing corresponding to the data conversion processing, and thereby calculates the quantized conversion coefficient value series (step S602). The information regeneration unit 512 outputs the quantized conversion coefficient value series to the coding unit 510.

Processing executed by the information compression device 511 will be described in detail. A quantized conversion coefficient value series highly frequently includes conversion coefficients having a value of 0. The information compression device 511 scans, for example, a coefficient (a data size is 16 bits×64=1024 bits) of 8×8 (=64) pixels in accordance with a predetermined scanning order and thereby executes processing to be described later. The information compression device 511 calculates, for a quantized conversion coefficient value series, a bit series (a size of 64 bits) indicating whether or not a value of each scanned conversion coefficient is non-zero and a conversion coefficient value series storing only conversion coefficients having a non-zero value. The conversion coefficient value series includes, for example, up to 28 conversion coefficients (a size of 16 bits×28=448 bits). In this case, the information compression device 511 calculates data having a size of 512 bits (=448 bits+64 bits). Therefore, a size of a quantized conversion coefficient value series becomes smaller by a portion where the quantized conversion coefficient value series does not include conversion coefficients having a value of 0.

In the above-described example, the information compression device 511 executes data conversion processing of reducing a size of a quantized conversion coefficient value series for 8×8 pixels. The data conversion processing may be executed for a conversion coefficient value series for each size of a plurality of predetermined sizes (e.g. 2×2 pixels, 4×4 pixels, and 8×8 pixels). In this case, an information compression device scans conversion coefficients calculated for a pixels block of each size in accordance with a predetermined scanning order. The information compression device generates flags (EOB) indicating whether or not each coefficient is a last non-zero coefficient in an orthogonal conversion block, a position (Index) of each conversion coefficient in a pixels block, and a value (Value) of each conversion coefficient for only non-zero coefficients in a quantized conversion coefficient value series. These pieces of processing do not transmit information of conversion coefficients having a value of 0. Therefore, these pieces of processing can largely reduce an amount of data transmission.

Next, with reference to an example in which a conversion coefficient value series generated in accordance with an H.265 method is compressed, processing in an information compression device will be described. While the information compression device executes data conversion processing for a quantized conversion coefficient value series. For convenience of description, it is assumed that data conversion processing is executed for a conversion coefficient value series. However, quantizing processing may not be necessarily executed. Further, it is assumed that orthogonal conversion processing is applied to an area where each frame is divided into pixels blocks including 32×32 pixels (size) and as a result, a conversion coefficient value series is calculated for each frame. A size of 32×32 pixels of an orthogonal conversion block is a maximum size usable in the case of an H.265 method. In the present example embodiment, using a pixels block of a different size (e.g. 64×64 pixels and the like) as a unit, orthogonal conversion processing may be applied.

Further, in accordance with an H.265 method, a block size to be applied with orthogonal conversion processing may not be necessarily one type or may be a plurality of types. A size of a pixels block applied with orthogonal conversion processing may include, for example, a pixels block having 32×32 pixels, a pixels block having 16×16 pixels, a pixels block having 8×8 pixels, and a pixels block having 4×4 pixels.

Figure 20:
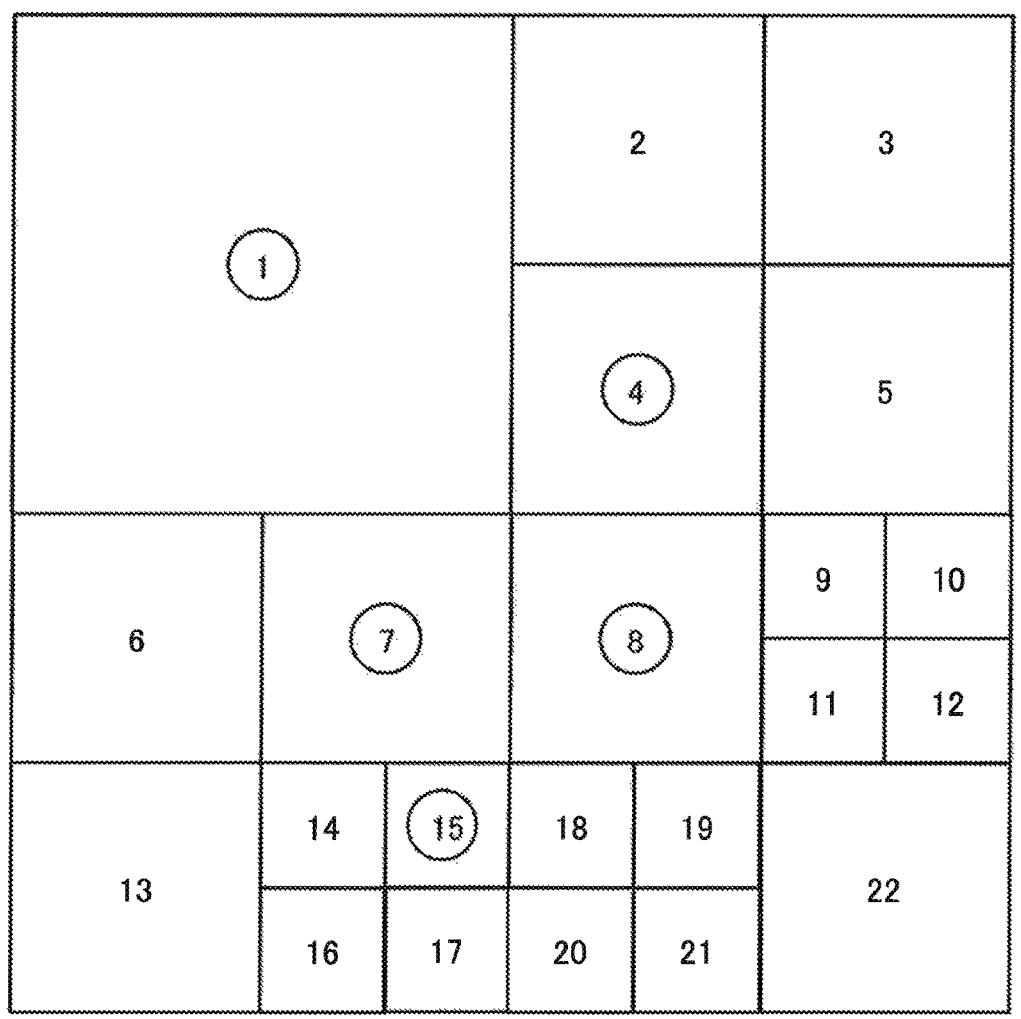
FIG. 20 is a diagram conceptually illustrating information calculated by orthogonal conversion processing.

With reference to FIG. 20, information calculated by orthogonal conversion processing will be described. FIG. 20 is a diagram conceptually illustrating information calculated by orthogonal conversion processing. A rectangle including a first rectangle to a 22-th rectangle as exemplified in FIG. 20 represents a pixels block (32×32 pixels) to be applied with orthogonal conversion processing. In this example, in a pixels block having 32×32 pixels including a first rectangle to a 22-th rectangle, orthogonal conversion processing is applied to pixels blocks including the following three sizes, respectively:

(i) One place with respect to a pixels block (a first rectangle) having 16×16 pixels, (ii) Nine places with respect to pixels blocks (second to eighth rectangles, a 13-th rectangle, and a 22-th rectangle) having 8×8 pixels, and (iii) Twelve places with respect to pixels blocks (ninth to 12-th rectangles and 14-th to 21-th rectangles) having 4×4 pixels.

Further, in FIG. 20, a rectangle assigned with a circular mark represents, of pixels blocks to be applied with orthogonal conversion processing, a pixels block (hereinafter, referred to as a "non-zero block") including one or more conversion coefficients in which a value of a conversion coefficient calculated for the pixels block is non-zero. A rectangle assigned with no circular mark represents, of pixels blocks to be applied with orthogonal conversion processing, a pixels block (hereinafter, referred to as a "zero block") that does not include any conversion coefficient in which a value of a conversion coefficient calculated for the pixels block is non-zero. In the example illustrated in FIG. 20, the number of non-zero blocks is one (a first rectangle) with respect to above-described (i), three (a fourth rectangle, a seventh rectangle, and an eighth rectangle) with respect to above-described (ii), and one (a 15-th rectangle) with respect to above-described (iii). In other words, a pixels block having 32×32 pixels includes five non-zero blocks (the first rectangle, the fourth rectangle, the seventh rectangle, the eighth rectangle, and the 15-th rectangle).

<First Example Embodiment>

Figure 1:
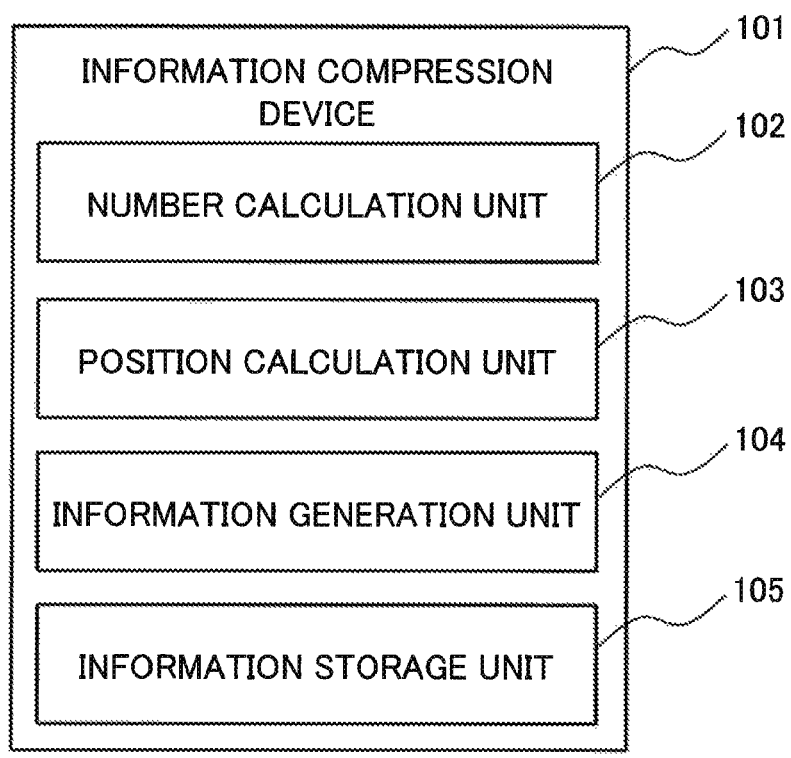
FIG. 1 is a block diagram illustrating a configuration of an information compression device according to a first example embodiment of the present invention.

With reference to FIG. 1, a configuration of an information compression device 101 according to a first example embodiment of the present invention will be described in detail. FIG. 1 is a block diagram illustrating a configuration of the information compression device 101 according to the first example embodiment of the present invention.

The information compression device 101 according to the first example embodiment of the present invention includes a number calculation unit (number calculator) 102, a position calculation (position calculator) unit 103, an information generation unit (information generator) 104, and an information storage unit (information storage) 105.

It is assumed that the information compression device 511 in the video coding device 501 illustrated in FIG. 18 is the information compression device 101.

Figure 2:
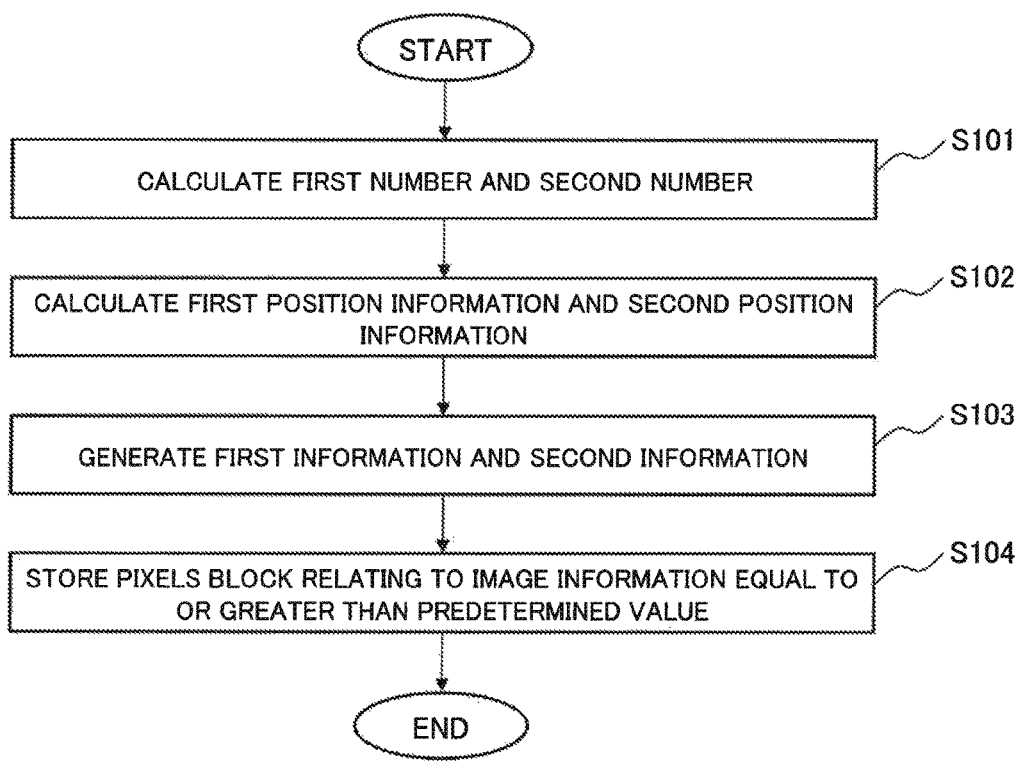
FIG. 2 is a flowchart illustrating a flow of processing in the information compression device according to the first example embodiment.

Next, with reference to FIG. 2, processing in the information compression device 101 according to the first example embodiment will be described. FIG. 2 is a flowchart illustrating a flow of processing in the information compression device 101 according to the first example embodiment.

The number calculation unit 102 inputs a numerical value series representing a target image from an external device (e.g. the quantizing unit 505 exemplified in FIG. 18). A frame image included in video data is divided with respect to each block (hereinafter, referred to as a "first block") having, for example, a predetermined size (e.g. 16×16 pixels, 8×8 pixels, or 4×4 pixels) representing a target to be applied with orthogonal conversion processing. The target image is a partial image included in an individual first block in the frame image. A first size is any predetermined size (e.g. 16×16 pixels, 8×8 pixels, or 4×4 pixels) as exemplified in FIG. 20. Further, a numerical value series for a first block is, for example, a conversion coefficient value series calculated as a result of applying orthogonal conversion processing (further, quantizing processing) to a target image in the first block.

Next, the number calculation unit 102 calculates a number (hereinafter, referred to as a "first number") of first blocks including a numerical value equal to or larger than a predetermined value on the basis of an input numerical value series for a second block (step S101). Each first bock is represented with a numerical value series. The second block has a second size equal to or greater than a first size and includes each first block. The second size is, for example, 32×32 pixels. In the processing illustrated in step S101, the number calculation unit 102 identifies first blocks included in 32×32 pixels (hereinafter, referred to as a "32×32 pixels block") in a frame. The frame includes one or more pixels blocks including the 32×32 pixels block as the processing target. The number calculation unit 102 determines whether a numerical value included in a numerical value series (e.g. a conversion coefficient value series) relating to the identified first block is equal to or greater than a predetermined value and determines, when the numerical value series includes a numerical value equal to or greater than the predetermined value, that the first block is a non-zero block. The number calculation unit 102 calculates a number (a "first number" described above) of first blocks determined as being a non-zero block (step S101).

Further, the number calculation unit 102 calculates, on the basis of an input numerical value series, with respect to a third block having a third size equal to or smaller than a first size, a number (hereinafter, referred to as a "second number") of first blocks in which a numerical value included in the numerical value series relating to the third block is equal to or greater than a predetermined value (step S101). The third size is, for example, 4×4 pixels (size). In the processing illustrated in step S101, the number calculation unit 102 sets, with respect to a non-zero block included in a 32×32 pixels block as a target, a third block having 4×4 pixels (hereinafter, referred to as a "4×4 pixels block") included in the non-zero block. The number calculation unit 102 determines whether or not a numerical value series (e.g. a conversion coefficient value series) relating to the set third block includes a numerical value equal to or greater than a predetermined value and determines, when the numerical value series includes a conversion coefficient equal to or greater than the predetermined value, that the third block is a non-zero block. The number calculation unit 102 calculates a number (a "second number" described above) of third blocks determined as being a non-zero block (step S101).

Next, the position calculation unit 103 calculates second position information for storing a numerical value series relating to a third block on the basis of the calculated second number (step S102). When, for example, a size of a storage area for storing a conversion coefficient relating to a third block is a predetermined storage capacity, the position calculation unit 103 multiplies the predetermined storage capacity by each integer ranging from 1 to a second number and thereby calculates a position for storing a numerical value series in a storage device. When, for example, a third block is a 4×4 pixels block and a predetermined storage capacity is 16 bits, the position calculation unit 103 multiplies 256 (=16×4×4) bits by each integer ranging from 1 to a second number and thereby calculates second position information for storing a numerical value series.

Further, the position calculation unit 103 calculates first position information indicating a position for storing second information relating to a second block on the basis of the calculated first number and the calculated second number (step S102). The second information is information (e.g. a size of a first block and position information of a first block in a second block) indicating a first block (e.g. a 16×16 pixels block) included in a second block (e.g. a 32×32 pixels block). Further, the second information includes second position information indicating a storage destination of a numerical value series relating to a third block (e.g. a 4×4 pixels block) included in a first block (e.g. a 16×16 pixels block) in the second block (e.g. a 32×32 pixels block).

Next, the information generation unit 104 generates first information including first position information calculated by the position calculation unit 103 with respect to one or more second blocks included in a target image (step S103). The information generation unit 104 generates, with respect to one or more second blocks included in a target image, second information including second position information indicating a storage destination of a numerical value series relating to a third block included in the second block (step S103). The information generation unit 104 may further generate second information including position information indicating a size of a second block and positions of one or more second blocks included in a first block. The information generation unit 104 stores second information calculated with respect to a certain second block in a position (storage area) indicated by first position information calculated with respect to the certain second block.

Next, the information storage unit 105 reads a value included in the target image for a third block in which a numerical value included in a numerical value series is equal to or greater than a predetermined value among one or more third blocks included in the target image. The information storage unit 105 stores the read value in a position (storage area), inside a storage device (memory), indicated by second position information indicating a storage destination of a numerical value series relating to the third block (step S104). The information storage unit 105 reads, for example, a value included in a target image with respect to a non-zero third block and stores the read value in a position indicated by second position information. In this case, the information storage unit 105 stores only a value of a conversion coefficient for a non-zero third block (e.g. a 4×4 pixels block) on a storage device by the processing illustrated in step S104.

Thereafter, when the information compression device 101 is realized, for example, using a function included in a GPU (e.g. the GPU 525 in FIG. 18), the information compression device 101 may transmit the generated first information, the generated second information, and only a value of a conversion coefficient for a non-zero third block to a CPU (e.g. the CPU 526 in FIG. 18).

Next, an advantageous effect relating to the information compression device 101 according to the first example embodiment will be described.

The information compression device 101 according to the first example embodiment can compress information necessary for coding processing to a smaller size. The reason is that while information (e.g. information relating to a processing unit such as a pixels block having a predetermined size) necessary for coding processing is maintained in information configuring a target image, only information referred to when the information compression device 101 generates a regenerated image and the like is stored in a storage destination inside a memory. For example, information necessary for coding a target image is being stored as first information generated by the information generation unit 104 and second information generated by the information generation unit 104. Further, the information storage unit 105 stores only a value of conversion coefficients relating to a non-zero third block on a storage device, and thereby, a value of a conversion coefficient that is not referred to when, for example, a regenerated image and the like is generated is not being stored on a storage device. In other words, only information referred to when a regenerated image and the like is generated is being stored on the information storage unit 105.

Therefore, the information compression device 101 according to the first example embodiment can compress information for coding processing to a smaller size.

<Second Example Embodiment>

Next, a second example embodiment of the present invention based on the above-described first example embodiment will be described.

Figure 3:
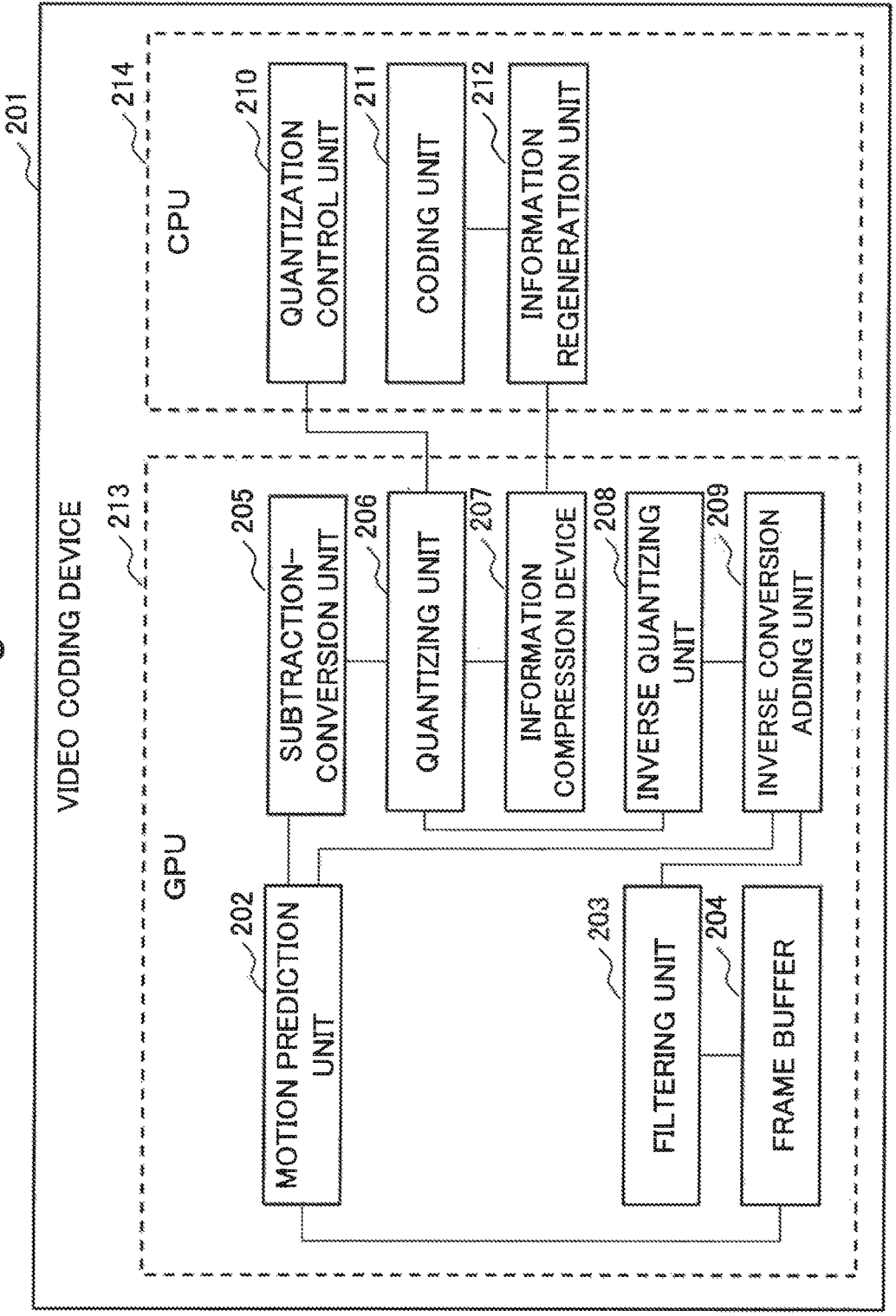
FIG. 3 is a block diagram illustrating a configuration of a video coding device according to a second example embodiment of the present invention.

With reference to FIG. 3, a video coding device 201 according to the second example embodiment of the present invention will be described. FIG. 3 is a block diagram illustrating a configuration of the video coding device 201 according to the second example embodiment of the present invention.

The video coding device 201 according to the second example embodiment includes a motion prediction unit (motion predictor) 202, a subtraction-conversion unit (subtraction-converter) 205, a quantizing unit (quantizer) 206, an inverse quantizing unit (inverse quantizer) 208, an inverse conversion adding unit (inverse conversion adder) 209, a filtering unit (filter) 203, a frame buffer 204, an information compression device 207, a quantization control unit (quantization controller) 210, an coding unit (coder) 211, and an information regeneration unit (information regenerator) 212. The information compression device 207 is, for example, the information compression device 101 illustrated in FIG. 1.

For convenience of description, it is assumed that processing in the motion prediction unit 202, the subtraction-conversion unit 205, the quantizing unit 206, the inverse quantizing unit 208, the inverse conversion adding unit 209, the filtering unit 203, the frame buffer 204, and the information compression device 207 is allocated to a GPU 213 as indicated by a dashed line of FIG. 3. It is assumed that processing in the quantization control unit 210, the coding unit 211, and the information regeneration unit 212 is allocated to a CPU 214 as indicated by a dashed line of FIG. 3. The motion prediction unit 202, the subtraction-conversion unit 205, the quantizing unit 206, the inverse quantizing unit 208, the inverse conversion adding unit 209, the filtering unit 203, the quantization control unit 210, and the coding unit 211 execute processing similar to the processing described with reference to FIG. 14 to FIG. 19, and therefore in the present example embodiment, detailed description on processing in each of these units will be omitted.

Figure 4:
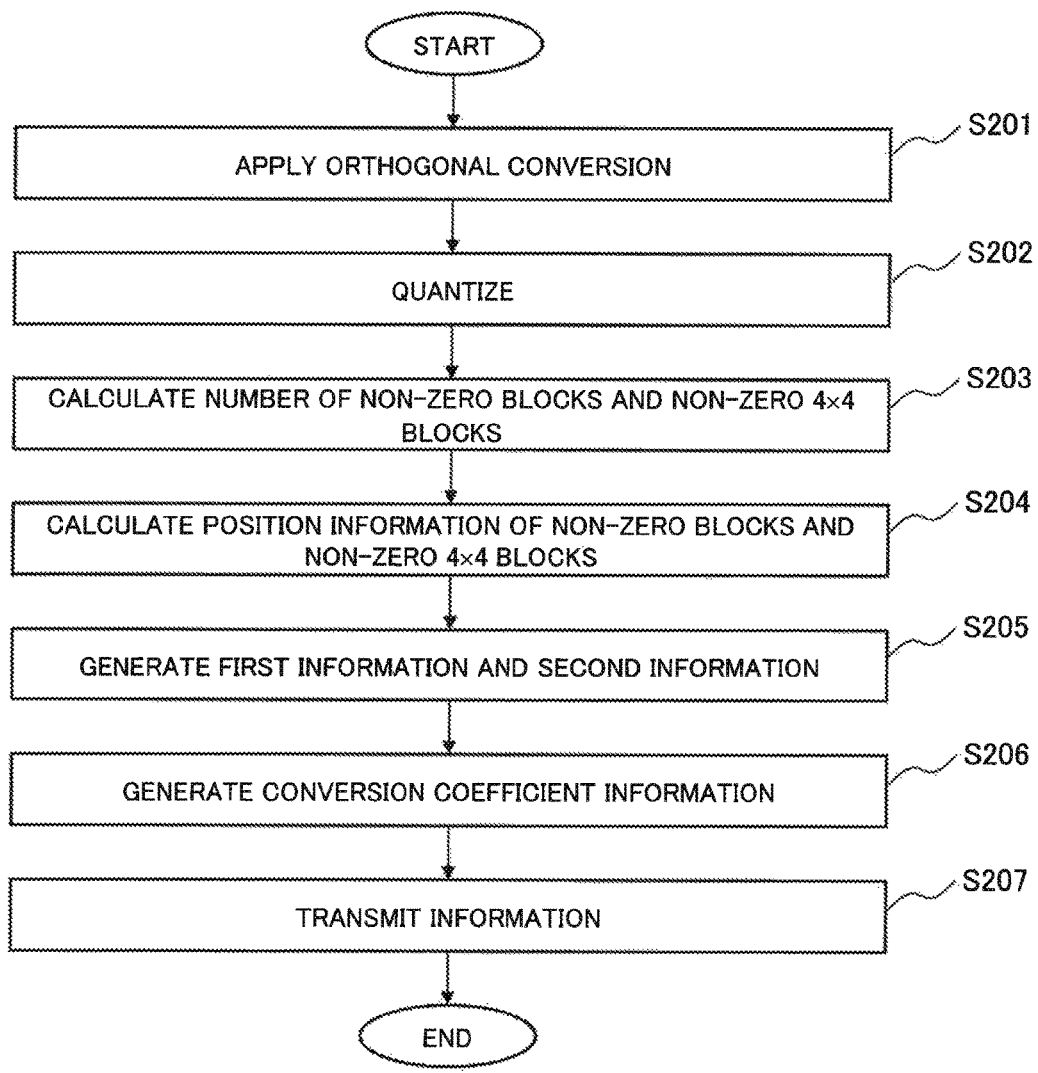
FIG. 4 is a flowchart illustrating a flow of processing in the video coding device according to the second example embodiment.

Next, with reference to FIG. 4, processing in the video coding device 201 according to the second example embodiment will be described with a focus on processing in the information compression device 207. FIG. 4 is a flowchart illustrating a flow of processing in the video coding device 201 according to the second example embodiment.

The subtraction-conversion unit 205 executes orthogonal conversion processing for an image in the pixels block with respect to each frame in video data using a first block having a predetermined size as a target and, thereby, generates a conversion coefficient value series relating to the first block (step S201). The subtraction-conversion unit 205 outputs the generated conversion coefficient value series to the quantizing unit 206.

The quantizing unit 206 inputs the conversion coefficient value series output by the subtraction-conversion unit 205, executes quantizing processing for each value included in the input conversion coefficient value series, and thereby generates a conversion coefficient value series in which the conversion coefficient value series is quantized (step S202). The quantizing unit 206 outputs the quantized conversion coefficient value series to the information compression device 207. In other words, the conversion coefficient value series output by the quantizing unit 206 is a numerical value series generated for a first block, with respect to each frame.

The information compression device 207 according to the second example embodiment inputs, with respect to each first block indicated by a first rectangle to a 22-th rectangle as exemplified in FIG. 20, a numerical value series (e.g. a conversion coefficient value series) relating to the first block. The first block is, for example, a pixels block having a predetermined size (e.g. 16×16 pixels or 8×8 pixels).

First, the information compression device 207 calculates, with respect to a second block having a second size (e.g. 32×32 pixels) equal to or greater than a first size, a first number of first blocks in which a numerical value included in a numerical value series relating to the first block included in the second block is equal to or greater than a predetermined value on the basis of an input numerical value series (step S203). In the example illustrated in FIG. 20, for example, the information compression device 207 calculates, on the basis of an input numerical value series, 5 (i.e. a first rectangle, a fourth rectangle, a seventh rectangle, an eighth rectangle, and a 15th rectangle) as a first number of non-zero blocks included in a 32×32 pixels block.

Figures 5, 6, 7:
FIG. 5 is a diagram illustrating one example of a first block having a size of 16×16 pixels.
FIG. 6 is a diagram illustrating one example of a first block having a size of 8×8 pixels.
FIG. 7 is a diagram conceptually illustrating one example of conversion coefficient information.

Next, the information compression device 207 determines, for each non-zero block, whether or not the third block is a non-zero block with respect to a third block having a third size (e.g. 4×4 pixels) equal to or smaller than the first size. The information compression device 207 performs quartering in a vertical direction and in a lateral direction when, for example, a size of a non-zero block is 16×16 pixels (exemplified in FIG. 5). FIG. 5 is a diagram illustrating one example of a first block having a size of 16×16 pixels.

In the case of the example illustrated in FIG. 5, the information compression device 207 quarters a 16×16 pixels block in a vertical direction and in a lateral direction and thereby determines whether or not each of 16 4×4 pixels blocks indicated by a 23-th rectangle to a 38-th rectangle is a non-zero block. In FIG. 5, a pixels block indicated by a rectangle with a circular mark represents a non-zero block, and a rectangle without a circular mark represents a zero block.

The information compression device 207 determines that the third block is a non-zero block when, for example, a numerical value series relating to a third block indicated by a 23-th rectangle includes a non-zero conversion coefficient in FIG. 5. The information compression device 207 determines that the third block is a zero block when, for example, all values of conversion coefficients in a numerical value series relating to the third block are 0. The information compression device 207 executes determination processing similar to the determination processing executed for a third block indicated by a 23-th rectangle, also with respect to third blocks indicated by a 24-th rectangle to a 38-th rectangle. In the case of the example illustrated in FIG. 5, the information compression device 207 determines that third blocks indicated by a 23-th rectangle to a 25-th rectangle and a 28-th rectangle are a non-zero block and determines that third blocks indicated by a 26-th rectangle, a 27-th rectangle, and a 29-th rectangle to a 38-th rectangle are a zero block.

Similarly, the information compression device 207 determines whether or not each second block (exemplified in FIG. 6) having a size different from a size (in this case, 16×16 pixels) of a second block illustrated in FIG. 5 is a non-zero block. FIG. 6 is a diagram illustrating one example of a first block having a size of 8×8 pixels. In the case of the example illustrated in FIG. 6, the information compression device 207 determines whether or not individual 4×4 pixels block is a non-zero block, for example, by bisecting the 8×8 pixels block in a vertical direction and in a lateral direction.

The information compression device 207 calculates a number (i.e. a second number) of non-zero third blocks (step S203). In the case of the examples of illustrated in FIG. 5 and FIG. 6, for example, the information compression device 207 calculates 5 (i.e. the number of third blocks indicated by a 23-th rectangle to a 25-th rectangle, a 28-th rectangle, and a 39-th rectangle) as a second number.

Next, the information compression device 207 calculates second position information indicating a position for storing a numerical value series relating to each third block on the basis of the calculated second number (step S204). Further, the information compression device 207 calculates first position information indicating a position for storing second information relating to a second block on the basis of the calculated first number and the calculated second number (step S204). In step S204, the information compression device 207 calculates first position information for storing second information relating to each second block.

The processing relating to step S204 will be further described specifically. The information compression device 207 may calculate, when calculating second position information relating to a certain first block, a cumulative number of second numbers calculated before processing for the certain first block is started with respect to a frame being processed and thereby calculate second position information. Further, the information compression device 207 may calculate, when calculating first position information relating to a certain second block, a cumulative number of first numbers calculated before processing for the certain second block is started with respect to a frame being processed and thereby calculate second position information.

Next, the information compression device 207 generates first information and second information (step S205). The information compression device 207 stores the generated second information in a position (storage area) indicated by first position information inside a storage device (memory).

Processing of generating first information and second information will be described later with reference to FIG. 8 to FIG. 9.

The information compression device 207 stores a numerical value series relating to a non-zero third block in a position indicated by the calculated second position information and thereby generates conversion coefficient information (FIG. 7) storing only a value of a conversion coefficient relating to a non-zero third block (step S206). FIG. 7 is a diagram conceptually illustrating one example of conversion coefficient information. When the information compression device 207 is realized using the GPU 213, the information compression device 207 transmits (transmits) the generated first information, second information, and conversion coefficient information to the CPU 214 (step S207).

Referring to FIG. 7, conversion coefficient information includes a numerical value series relating to third blocks indicated by a 23-th rectangle to a 25-th rectangle and a 28-th rectangle illustrated in FIG. 5 and a numerical value series relating to a third block indicated by a 39-th rectangle illustrated in FIG. 6. In FIG. 5 and FIG. 6, a rectangle with a circular mark represents a none-zero third block, and therefore the conversion coefficient information includes only a value of a conversion coefficient relating to a non-zero third block. In other words, the conversion coefficient information does not include a value of a conversion coefficient relating to a zero third block.

Next, with reference to a data structure included in first information, second information, or conversion coefficient information, processing in the information compression device 207 according to the present example embodiment will be described.

First, with reference to FIG. 8, a data structure included in first information will be described. FIG. 8 is a diagram conceptually illustrating one example of a data structure in first information.

Referring to FIG. 8, first information is information in which, for example, a block number for identifying a second block, the number of non-zero blocks among first blocks included in a second block indicated by the block number, and first position information indicating a position for storing second information relating to the second block are associated with one another. In the first information, for example, a block number "1", the number of pixels blocks "3", and first position information "1" are associated with one another. This indicates that a second block (e.g. a 32×32 pixels block) indicated by the block number "1" includes three non-zero first blocks and second information relating to these first blocks is stored in a storage area starting from the first position information "1".

In the first information exemplified in FIG. 8, a block number "2", the number of pixels blocks "5", and first position information "4" are associated with one another. This indicates that a second block (e.g. a 32×32 pixels block) indicated by the block number "2" includes five non-zero first blocks and second information relating to these first blocks is stored in a storage area starting from the first position information "4". As described in the processing relating to step S204, first position information "4" associated with a block number "2" is calculated on the basis of the number of blocks (in this case, the number of blocks "3") calculated before, for example, processing for blocks indicated by the block number "2" is started (in processing for blocks indicated by a block number "1" in this case). First position information relating to a block number "2" is calculated, for example, as a total value of first position information "1" associated with a block number "1" and the number of blocks "3" associated with the block number "1". The first position information is not limited to the above-described example.

First information represents information in which, with respect to each 32×32 pixels block included in a frame, the number of non-zero blocks included in the 32×32 pixels block and a top address of a storage area for storing information relating to the 32×32 pixels block are associated with each other. In this case, the number of 32×32 pixels blocks included in a frame is constant, and therefore first information has a size of a fixed length. Hereinafter, it is assumed that first information is information indicating, with respect to each 32×32 pixels block, a top address of a storage area that stores information relating to the 32×32 pixels block. In other words, first information includes the number of non-zero blocks included in the 32×32 pixels block and first position information indicating a top address of a storage area for storing information relating to the 32×32 pixels block.

The information compression device 207 according to the present example embodiment assigns a block number to a second block set in step S203 and generates first information in which the assigned block number, a first number calculated in step S203, and first position information calculated in step S204 are associated with one another.

Next, with reference to FIG. 9, a data structure included in second information will be described. FIG. 9 is a diagram conceptually illustrating one example of a data structure of second information.

Referring to FIG. 9, second information is information including, with respect to a certain first block, second position information indicating a storage area for storing a conversion coefficient series (or a numerical value series) relating to a third block included in the first block. Second information may further include information (a series of "non-zero?" in FIG. 9) indicating whether or not a third block included in the first block is a non-zero block. Second information may include information ("vertical direction" and "lateral direction" of "position" in FIG. 9) indicating a position of one or more third blocks included in a second block.

Second information may further include a size of the first block and a position ("vertical direction" and "lateral direction" of "non-zero position" in FIG. 9) where a last non-zero conversion coefficient appears in the first block, when a numerical value series relating to a first block is scanned in accordance with a predetermined scanning order.

In other words, second information may include, with respect to a first block, information exemplified in information 1 to information 6 as follows:

(Information 1) Information indicating whether a first block is a brightness block or a color difference block ("type information" cIdx in FIG. 9), (Information 2) Position information indicating a position of one or more first blocks included in a second block ("position" in FIG. 9, a vertical direction (posY), and a lateral direction (posX)), (Information 3) Size information indicating a size of the second block ("size" in FIG. 9, log2trafoSize), (Information 4) Non-zero position information indicating a position where a last non-zero conversion coefficient appears in the second block, when non-zero conversion coefficients included in the second block are scanned in accordance with a predetermined scanning order ("non-zero position" in FIG. 9, lastSignificantCoeffX (lateral direction), and lastSignificantCoeffY (vertical direction)), (Information 5) Block information indicating whether or not each third block is a non-zero block when third blocks are scanned in accordance with a predetermined scanning order in the second block ("non-zero?" in FIG. 9 coded_sub_block_flag), and (Information 6) Second information (index) indicating a top address of a storage area for storing a conversion coefficient relating to each non-zero third block in the second block. Second position information may store a value in which, for example, a top address indicating a storage area for storing a conversion coefficient relating to a non-zero third block is represented by a relative position from a top third block.

Therefore, the information compression device 207 and the information regeneration unit 212 and the like refer to second position information in the information 6 and thereby can read a value of a conversion coefficient relating to a non-zero 4×4 pixels block in a certain non-zero block.

In the second information exemplified in FIG. 9, for example, type information "2", a vertical direction "1" of a position, a lateral direction "1" of the position, a size "8", a vertical direction "5" of a non-zero position, a lateral direction "5" of the non-zero position, non-zero "0,1,1, . . . ", and second position information "5" are associated with one another. This indicates that, for example, a type of a first block is a color difference block, a position of the first block in a second block is (1,1), and a size of the first block is 8. Further, this indicates that a position where a last non-zero conversion coefficient value appears at (5,5) when a first block is scanned in accordance with a predetermined scanning order and a zero block (0), a non-zero block (1), and a non-zero block (1) are arranged in this order when third blocks are scanned in a first block in accordance with a predetermined scanning order. Further, this indicates that a top position for storing a conversion coefficient relating to a non-zero third block is 5.

Second position information in the second information exemplified in FIG. 9 is calculated, as described above for step S204, by a cumulative number of second numbers calculated before, for example, processing for a third row (a row indicated by type information "2", a vertical direction "1", . . . ) of FIG. 9 is started (in first to second rows in this case). FIG. 9 exemplifies second information in which a first block indicated in a first row includes two non-zero third blocks and a first block indicated in a second row includes two non-zero third blocks. In this case, second information described in a third row of FIG. 9 is 5 (=2+2+1). The second information is not limited to the example illustrated in FIG. 9. Second position information in second information may include, for example, with respect to each non-zero third block included in a first block, a top address indicating a storage area that stores a conversion coefficient relating to the third block.

The information compression device 207 according to the present example embodiment identifies, for example, a position of one or more first blocks included in a second block and thereby generates "information 2" described above in step S205. The information compression device 207 identifies a position where a non-zero conversion coefficient appears, when non-zero conversion coefficients included in a second block are scanned in accordance with a predetermined scanning order, and thereby generates "information 4" described above. The information compression device 207 scans third blocks in accordance with a predetermined scanning order in a second block, determines whether or not each scanned third block is a non-zero block, and thereby generates "information 5" described above. The information compression device 207 stores read type information with respect to "information 1" in second information.

Next, with reference to FIG. 10, a data structure included in conversion coefficient information will be described. FIG. 10 is a diagram conceptually illustrating one example of a data structure included in conversion coefficient information. In conversion coefficient information exemplified in FIG. 10, a value of a conversion coefficient included in the conversion coefficient value series exemplified in FIG. 7 is specifically described.

Referring to the conversion coefficient information exemplified in FIG. 10, the conversion coefficient information includes a conversion coefficient value "1,2,3, . . . ". This indicates that a value of a conversion coefficient relating to a non-zero third block is "1,2,3, . . . ".

Therefore, the information compression device 207 according to the present example embodiment generates record information including first information exemplified in FIG. 8, second information exemplified in FIG. 9, and conversion coefficient information exemplified in FIG. 10.

Further, a storage area that stores first information, a storage area that stores second information, and a storage area that stores conversion coefficient information are preferably disposed in continuous addresses in an address space of a main storage device (memory). The reason is that these three pieces of information are associated with one another and therefore when a certain piece of information is transmitted, other two pieces of information need to be transmitted. For example, storage areas that store these three pieces of information are disposed in continuous addresses, and thereby the information compression device 207 can execute burst transmission for transmitting information by one-time processing upon transmission from the CPU 214 to the GPU 213.

In the description described above with reference to FIG. 4, the pieces of processing illustrated in step S201 and step S202 are pieces of processing independent with respect to individual non-zero block, and therefore the information compression device 207 may execute step S201 and step S202 for a plurality of non-zero blocks in parallel or in a pseudo-parallel. Further, the processing described in step S203 and the processing described in step S204 are pieces of processing independent of each other with respect to each 32×32 pixels block, and therefore, the information compression device 207 may execute step S203 and step S204 for a plurality of 32×32 pixels blocks in parallel or in a pseudo-parallel. The processing described in step S201 to step S204 is not limited to the above-described examples.

The processing described in step S204 includes processing of referring to, with respect to a certain pixels block, a processing result for a pixels block different from the certain pixels block. The processing is a calculation of a partial sum of continuous numerical value series and is referred to also as scan processing or prefix sum processing. With regard to the scan processing or the prefix sum processing, an efficient parallel processing technique has been proposed, but herein description on the parallel processing technique will be omitted.

In this manner, step S201 to step S204 in FIG. 4 are processing capable of executing efficient parallel processing respectively, and therefore when the processing is allocated to a processor such as the GPU 213 used for parallel processing, video coding processing can be executed at high speed.

Further, a storage area that stores first information, a storage area that stores second information, and a storage area that stores conversion coefficient information are allocated to continuous addresses, and thereby the information compression device 207 can realize data transmission described in step S207 by one-time burst transmission. A storage area is allocated in this manner, and thereby the information compression device 207 can realize data transmission in a short period.

Next, an advantageous effect relating to the video coding device 201 according to the second example embodiment will be described.

The video coding device 201 according to the second example embodiment can compress information necessary for coding processing to a smaller size. The reason is that the video coding device 201 according to the second example embodiment includes the information compression device 101 according to the first example embodiment. The reason will be described in detail.

The video coding device 201 manages each frame in 4×4 pixels block units and further executes processing of data transmission for only information of a non-zero 4×4 block among 4×4 pixels blocks. With an increase in a size of one pixels block, it is highly possible that a conversion coefficient having a value of 0 is included. However, a conversion coefficient having a value of 0 is not used in post-processing of video coding processing, and therefore even when such a conversion coefficient is calculated in processing executed by the GPU 213, the conversion coefficient does not need to be transmitted to the CPU 214 that executes post-processing. The video coding device 201 according to the present example embodiment, for example, transmits only a conversion coefficient of a non-zero 4×4 block, and, therefore, can largely reduce a size of transmission data. When, for example, non-zero 4×4 blocks exist only at several % to approximately 10% in a frame, the video coding device 201 according to the present example embodiment can reduce a size of transmission data to approximately a tenth or less.

Further, the video coding device 201 according to the present example embodiment can execute data conversion processing at high speed. The reason is that data conversion processing itself is highly efficient parallel processing, and further, the data conversion processing can be realized by a parallel processor such as the GPU 213. The video coding device 201 hierarchically manage information relating to a pixels block including 32×32 pixels by using an orthogonal conversion block and a small pixels block such as a 4×4 pixels block, and therefore pieces of data conversion processing themselves can be realized in a highly parallel.

In contrast, data conversion processing in the method described in, for example, NPL 5 is complex. The method scans all conversion coefficients in accordance with a predetermined scanning order with respect to an orthogonal conversion block and calculates a conversion coefficient value series including the conversion coefficients in the scanned order. The method sequentially calculates a value such as an EOB and an index on the basis of a conversion coefficient included in the conversion coefficient value series. In other words, the method sequentially calculates a condition determination for each conversion coefficient in processing of calculating an EOB. Therefore, even when this method is implemented on a processor capable of executing parallel processing such as the GPU 213, it is difficult to execute the method in a short period.

The technique described in NPL 5 executes, for example, sequential processing for 1024 conversion coefficients with regard to an orthogonal conversion block including 32×32 pixels. In contrast, the video coding device 201 according to the present example embodiment executes sequential processing for 64 (=1024/(4×4)) orthogonal conversion blocks, 64 4×4 pixels blocks, or 16 (=4×4) conversion coefficients at most since division into third blocks including a plurality of conversion coefficients is performed. Therefore, the video coding device 201 according to the present example embodiment can largely reduce sequential processing, and therefore can execute video coding processing in a short period.

When a coding method is an H.265 method, it is necessary to process an orthogonal conversion block having a size such as 16×16 pixels or 32×32 pixels, and therefore data conversion processing in accordance with the H.265 method needs more pieces of processing. The technique described in, for example, NPL 5 executes sequential processing for a conversion coefficient value series including 1024 conversion coefficients when processing an orthogonal conversion block of 32×32 pixels in accordance with an H.265 method. As a result, the data conversion processing needs a long processing time. As a result, according to the technique described in NPL 5, a time required for data conversion processing and processing such as data inverse conversion processing is long, and therefore it is difficult to execute video coding processing in a short period.

<Third Example Embodiment>

Next, a third example embodiment of the present invention based on the above-described first example embodiment will be described.

In the following description, a characteristic portion according to the present example embodiment will be mainly described, and a component similar to the above-described first example embodiment is assigned with the same reference number and thereby overlapping description will be omitted.

With reference to FIG. 11, an information compression device 301 according to the third example embodiment of the present invention will be described. FIG. 11 is a block diagram illustrating a configuration of the information compression device 301 according to the third example embodiment of the present invention.

The information compression device 301 according to the third example embodiment of the present invention includes a number calculation unit (number calculator) 302, a position calculation unit (position calculator) 103, an information generation unit (information generator) 104, an information storage unit (information storage) 105, and a parameter determination unit (parameter determiner) 303.

The information compression device 301 executes processing in a video coding device 201 as exemplified, for example, in FIG. 3. In this case, the information compression device 301 corresponds to the information compression device 207 illustrated in FIG. 3

Next, with reference to FIG. 12, processing in a video coding device including the information compression device 301 according to the third example embodiment will be described with a focus on processing in the information compression device 301. FIG. 12 is a flowchart illustrating a flow of processing in a video coding device 201 including the information compression device 301 according to the third example embodiment.

For convenience of description, it is assumed that a "non-zero 4×4 block" denotes a pixels block determined as a non-zero block among pixels blocks including 4×4 pixels (i.e. 4×4 pixels blocks) for a third block. A first block is applied with orthogonal conversion processing, and therefore it is assumed that "orthogonal conversion block" denotes a first block. It is assumed that "non-zero orthogonal conversion block" denotes a pixels block determined as a non-zero block out of orthogonal conversion blocks. Note that, a first block and a third block are not limited to the above-described example.

A subtraction-conversion unit 205 executes orthogonal conversion processing of an image in the pixels blocks with respect to one or more frames included in video data for a first block having a predetermined size, and thereby generates a conversion coefficient value series representing an image in the first block (step S201). The subtraction-conversion unit 205 outputs the generated conversion coefficient value series to a quantizing unit 206.

The quantizing unit 206 inputs the conversion coefficient value series output by the subtraction-conversion unit 205, executes quantizing processing for each value included in the input conversion coefficient value series, and thereby generates a conversion coefficient value series in which the conversion coefficient value series is quantized (step S202). The quantizing unit 206 outputs the quantized conversion coefficient value series to the information compression device 301. In other words, a conversion coefficient value series output by the quantizing unit 206 is a conversion coefficient value series generated for a first block, with respect to each frame.

Next, a number calculation unit 302 in the information compression device 301 inputs a numerical value series (i.e. a conversion coefficient value series relating to an orthogonal conversion block) output by the quantizing unit 206. The number calculation unit 302 executes processing in step S203 as described with reference to FIG. 4 and thereby calculates a first number and a second number (step S303). The number calculation unit 302 outputs the calculated first number and second number to a parameter determination unit 303.

The parameter determination unit 303 inputs the first number and the second number output by the number calculation unit 302. The parameter determination unit 303 determines whether or not the input second number satisfies a predetermined second criterion (step S304). The predetermined second criterion is, for example, a condition indicating whether or not the second number exceeds a predetermined number. The predetermined number may be defined, for example, using a ratio to a number of 4×4 pixels blocks (i.e. "third blocks") (e.g. 20% of the number) included in a non-zero orthogonal conversion block included in a frame. The parameter determination unit 303 can determine whether or not a transmission data amount (generated code amount) necessary for executing video coding processing for the frame is large or small based on processing of determining whether the second number satisfies a predetermined second criterion or not.

When the input second number does not satisfy the predetermined second criterion (NO in step S304), the parameter determination unit 303 sets a value of a quantizing parameter to be a larger value (step S305). When, for example, a second number exceeds 20% of the number of 4×4 pixels blocks in a frame, the parameter determination unit 303 determines that the transmission data amount is excessive and sets a larger value as a value of a quantizing parameter for determining whether to be a non-zero block. When a value of a quantizing parameter is set to be large, the number of pixels blocks in which a third block (or a first block) is determined as a non-zero block decreases. As a result, the number of non-zero 4×4 pixels blocks and the like decrease by increasing a value of a quantizing parameter.

Then, the number calculation unit 302 calculates a first number of first blocks (e.g. non-zero blocks) and a second number of third blocks (e.g. non-zero 4×4 pixels blocks) based on the set quantizing parameter (step S303).

When an input second number satisfies the predetermined second criterion (YES in step S304), the position calculation unit 103 executes processing illustrated in step S204.

The predetermined second criterion is not limited to the above-described example. For example, the predetermined second criterion may be a condition indicating whether or not an evaluation value calculated by weighted average processing for a first number of non-zero orthogonal conversion blocks included in the frame and a second number of non-zero 4×4 pixels blocks included in the frame exceeds a predetermined upper limit value. The processing of calculating a weighted average is, for example, processing of calculating a value obtained by multiplying a first number by a predetermined weight and a value obtained by multiplying a second number by a predetermined weight and adding the calculated two values. In this case, if a calculated evaluation value exceeds a predetermined upper limit value, the parameter determination unit 303 calculates a ratio of the evaluation value to the predetermined upper limit value and calculates a width (increased width) for increasing a value to be set for a quantizing parameter in accordance with the calculated ratio. The parameter determination unit 303 sets a value of a quantizing parameter on the basis of the calculated increased width.

Thereafter, the information compression device 301 executes processing similar to the processing illustrated in step S205 to step S207 as described with reference to FIG. 4.

Next, an advantageous effect relating to the information compression device 301 according to the third example embodiment will be described.

The information compression device 301 according to the third example embodiment can compress information necessary for coding processing to a smaller size. The reason why the information compression device 301 produces the advantageous effect is similar to the reason why the information compression device 101 according to the first example embodiment produces the advantageous effect.

Further, the information compression device 301 according to the third example embodiment can adjust a time required for video coding processing. The reason is that the information compression device 301 sets a value of a quantizing parameter and executes quantizing processing on the basis of the set value. The reason will be described in detail.

A value of a quantizing parameter represents a criterion for determining whether or not a first block (or a third block) is a non-zero block. When determining that a transmission data amount is large, the information compression device 301 sets a value of a quantizing parameter to be a larger value and thereby decreases the transmission data amount. Therefore, the information compression device 301 according to the third example embodiment can adjust a transmission data amount, and, therefore, can adjust time required for video coding processing. Further, the information compression device 301 enables a transmission data amount to be further reduced by setting a larger value as a quantizing parameter, and therefore can provide video coding processing having higher processing efficiency.

The parameter determination unit 303 adjusts a value of a quantizing parameter on the basis of the number of non-zero orthogonal conversion blocks and the number of non-zero 4×4 pixels blocks. As a result, a processing amount (calculation amount) is small in processing of adjusting a value of a quantizing parameter. Therefore, the information compression device 301 including the parameter determination unit 303 can realize appropriate quantizing processing by processing that needs a small calculation amount, and further, can calculate a feature value representing a frame via the quantizing processing. Therefore, the information compression device 301 can stably realize video coding processing even when a value of a quantizing parameter is not appropriate or when a transmission data amount is very large since an input image is very complex.

Further, in order to maintain a bit rate for video data, when a transmission data amount is very large for a specific frame in the video data, a video coding device may execute processing of reducing a transmission data amount for a frame different from the specific frame. In this case, image quality for the frame different from the specific frame decreases. The information compression device 301 appropriately sets a value of a quantizing parameter and, therefore, a frame requiring excessive coding amount is not generated. Therefore, according to the information compression device 301, a situation where image quality for a frame different from the specific frame decreases does not occur. In other words, the information compression device 301 according to the third example embodiment can provide stable image quality for video data.

In the above-described examples, with reference to an example in which coding processing is executed in accordance with an H.265, processing in the information compression device 301, processing in a video coding device, and the like have been described. However, a coding method is not limited to an H.265 method, and a different coding method such as a VC-1 method and a coding method that is not included in internationally standardized video coding methods and the like are applicable. Further, processing for a conversion coefficient is not limited to the above-described examples, and a method in which, for example, information of a conversion coefficient relating to a pixels block is hierarchically managed may be applicable.

In the above-described examples, with reference to an example of a video coding method for executing orthogonal conversion processing such as DCT, processing in the information compression device 301, processing in a video coding processing device, and the like have been described. However, processing in the information compression device 301 and processing in a video coding device may be processing similar to the above-described orthogonal conversion processing even in case of a coding method based on a conversion method such as wavelet conversion or in case of a coding method such that quantizing processing without executing conversion processing for a predictive error image.

In the above-described examples, with reference to an example in which an accelerator is a GPU, processing in the information compression device 301, processing in a video coding device, and the like have been described. However, an accelerator may be a device such as a plurality of CPUs, a PC cluster, an FPGA, and a dedicated LSI circuit. In this case, the information compression device 301 executes processing similar to processing executed when an accelerator is a GPU.

The LSI represents an abbreviation of a Large-Scale Integration. The PC represents a personal computer.

(Hardware Configuration Example)

A configuration example of hardware resources that realize an information compression device or a coding device according to each example embodiment of the present invention will be described. However, the information compression device or the coding device may be realized using physically or functionally at least two calculation processing devices. Further, the information compression device or the coding device may be realized as a dedicated apparatus.

FIG. 13 is a block diagram schematically illustrating a hardware configuration of a calculation processing device capable of realizing the information compression device or the coding device according to the first to third example embodiments of the present invention. A calculation processing device 220 includes a central processing unit (CPU) 221, a memory 222, a disk 223, a non-transitory recording medium 224, a communication interface (hereinafter, expressed as. "communication I/F") 227 and a display 228. The calculation processing device 220 may connect an input device 225 and an output device 226. The calculation processing device 220 can execute transmission/reception of information to/from another calculation processing device and a communication apparatus via the communication I/F 227.

The non-transitory recording medium 224 is, for example, a computer-readable Compact Disc, Digital Versatile Disc. The non-transitory recording medium 224 may be Universal Serial Bus (USB) memory, Solid State Drive or the like. The non-transitory recording medium 224 allows a related program to be holdable and portable without power supply. The non-transitory recording medium 224 is not limited to the above-described media. Further, a related program can be carried via a communication network by way of the communication I/F 227 instead of the non-transitory recording medium 224.

In other words, the CPU 221 copies, on the memory 222, a software program (a computer program: hereinafter, referred to simply as a "program") stored by the disk 223 when executing the program and executes arithmetic processing. The CPU 221 reads data necessary for program execution from the memory 222. When display is needed, the CPU 221 displays an output result on the display 228. When a program is input from the outside, the CPU 221 reads the program from the input device 225. The CPU 221 interprets and executes an information compression program (FIG. 2, FIG. 4, or FIG. 12) present on the memory 222 corresponding to a function (processing) indicated by each unit illustrated in FIG. 1, FIG. 3, or FIG. 11 described above. The CPU 221 sequentially executes the processing described in each example embodiment of the present invention.

In other words, in such a case, it is conceivable that the present invention can also be made using an information compression program or a coding program. Further, it is conceivable that the present invention can also be made using a computer-readable, non-transitory recording medium storing the information compression program or the coding program.

The present invention has been described using the above-described example embodiments as example cases. However, the present invention is not limited to the above-described example embodiments. In other words, the present invention is applicable with various aspects that can be understood by those skilled in the art without departing from the scope of the present invention.

This application is based upon and claims the benefit of priority from Japanese patent application No. 2015-220990, filed on Nov. 11, 2015, the disclosure of which is incorporated herein in its entirety.

REFERENCE SIGNS LIST

101 information compression device
102 number calculation unit 103 position calculation unit
104 information generation unit
105 information storage unit
201 video coding device
202 motion prediction unit
203 filtering unit
204 frame buffer
205 subtraction-conversion unit
206 quantizing unit
207 information compression device
208 inverse quantizing unit
209 inverse conversion adding unit
210 quantization control unit
211 coding unit
212 information regeneration unit
213 GPU
214 CPU
301 information compression device
302 number calculation unit
303 parameter determination unit
220 calculation processing device
221 CPU
222 memory
223 disc
224 non-transitory recording medium
225 input device
226 output device
227 communication IF
228 display
501 video coding device
502 motion prediction unit
503 filtering unit
504 frame buffer
505 quantizing unit
506 subtraction-conversion unit
507 inverse quantizing unit
508 inverse conversion adding unit
509 quantization control unit
510 coding unit
521 GPU
522 CPU
523 GPU
524 CPU
511 information compression device
512 information regeneration unit
525 GPU
526 CPU

The invention claimed is:

1. An information compression device comprising:
a number calculator configured to calculate, based on a numerical value series representing a target image in a plurality of first blocks obtained by dividing the target image for a first size, with respect to a second block having a second size equal to or greater than the first size, a first number of a first block where a numerical value included in the numerical value series relating to the first block included in the second block is equal to or greater than a predetermined value, and calculate, with respect to a third block having a third size equal to or smaller than the first size, a second number where a numerical value included in the numerical value series relating to the third block is equal to or greater than the predetermined value;
a position calculator configured to calculate, based on the calculated second number, second position information upon storing the numerical value series relating to the third block on a memory, and calculate, based on the calculated first number and the calculated second number, first position information upon storing, on the memory, second information relating to the first block included in the second block, the second information including at least the second position information relating to the third block included in the first block;
an information generator configured to generate first information including at least the first position information and the second information, and store the generated second information in a storage area indicated by the first position information in the memory; and
an information storage configured to store, in a storage area indicated by the second position information in the memory, the numerical value series relating to the third block where a numerical value included in the numerical value series relating to the third block is equal to or greater than the predetermined value.

2. The information compression device according to claim 1, wherein
the information generator generates position information indicating a position of a first block in the second block, and generates the second information including the generated position information.

3. The information compression device according to claim 1, wherein
the information generator generates size information indicating a size of the first block, and generates the second information including the generated size information.

4. The information compression device according to claim 1, wherein
the information generator scans the numerical value series relating to the first block in accordance with a predetermined scanning order, identifies a last position where a numerical value having a non-zero value appears, generates non-zero position information indicating the identified position, and generates the second information including the generated non-zero position information.

5. The information compression device according to claim 1, wherein
the information generator determines, in accordance with the predetermined scanning order in the second block, whether or not a numerical value included in the numerical value series relating to the third block is equal to or greater than the predetermined value, generates block information indicating a determination result for each of the third block, and generates the second information including the generated block information.

6. The information compression device according to claim 1, further comprising
a parameter determiner configured to determine whether or not the second number is more than a predetermined number, and set a larger value as the predetermined value when the second number is more than the predetermined number, wherein
the number calculator calculates the first number and the second number, based on the predetermined value set by the parameter determiner.

7. The information compression device according to claim 1, wherein
the number calculator executes, when calculating the second number, processing in parallel or in a pseudo-parallel with respect to each of the first block.

8. A video coding device comprising
the information compression device according to claim 1.

9. An information compression method comprising:
calculating, based on a numerical value series representing a target image in a plurality of first blocks obtained by dividing the target image for a first size, with respect to a second block having a second size equal to or greater than the first size, a first number of a first block where a numerical value included in the numerical value series relating to the first block included in the second block is equal to or greater than a predetermined value, and calculating, with respect to a third block having a third size equal to or smaller than the first size, a second number where a numerical value included in the numerical value series relating to the third block is equal to or greater than the predetermined value;
calculating, based on the calculated second number, second position information upon storing the numerical value series relating to the third block on a memory, and calculating, based on the calculated first number and the calculated second number, first position information upon storing, on the memory, second information relating to the first block included in the second block, the second information including at least the second position information relating to the third block included in the first block;
generating first information including at least the first position information and the second information, and storing the generated second information in a storage area indicated by the first position information in the memory; and
storing, in a storage area indicated by the second position information in the memory, the numerical value series relating to the third block where a numerical value included in the numerical value series relating to the third block is equal to or greater than the predetermined value.

10. A non-volatile recording medium storing an information compression program recorded therein, the program making a computer achieve:

a number calculation function configured to calculate, based on a numerical value series representing a target image in a plurality of first blocks obtained by dividing the target image for a first size, with respect to a second block having a second size equal to or greater than the first size, a first number of a first block where a numerical value included in the numerical value series relating to the first block included in the second block is equal to or greater than a predetermined value, and calculate, with respect to a third block having a third size equal to or smaller than the first size, a second number where a numerical value included in the numerical value series relating to the third block is equal to or greater than the predetermined value;
a position calculation function configured to calculate, based on the calculated second number, second position information upon storing the numerical value series relating to the third block on a memory, and calculate, based on the calculated first number and the calculated second number, first position information upon storing, on the memory, second information relating to the first block included in the second block, the second information including at least the second position information relating to the third block included in the first block;
an information generation function configured to generate first information including at least the first position information and the second information, and store the generated second information in a storage area indicated by the first position information in the memory; and
an information storage function configure to store, in a storage area indicated by the second position information in the memory, the numerical value series relating to the third block where a numerical value included in the numerical value series relating to the third block is equal to or greater than the predetermined value.

* * * * *